(12) United States Patent
Fredriksson et al.

(10) Patent No.: US 9,419,737 B2
(45) Date of Patent: Aug. 16, 2016

(54) HIGH SPEED EMBEDDED PROTOCOL FOR DISTRIBUTED CONTROL SYSTEMS

(71) Applicant: Concio Holdings LLC, Winnetka, IL (US)

(72) Inventors: Lars-Berno Fredriksson, Kinna (SE); Kent Åke Lennart Lennartsson, Fotskäl (SE); Jonas Henning Olsson, Molnlycke (SE)

(73) Assignee: Concio Holdings LLC, Winnetka, IL (US)

( * ) Notice: Subject to any disclaimer, the term of this patent is extended or adjusted under 35 U.S.C. 154(b) by 128 days.

(21) Appl. No.: 14/287,154

(22) Filed: May 26, 2014

(65) Prior Publication Data

US 2014/0328357 A1 Nov. 6, 2014

Related U.S. Application Data

(63) Continuation-in-part of application No. 13/965,342, filed on Aug. 13, 2013, now Pat. No. 8,897,319, and a continuation-in-part of application No. 13/833,238, filed on Mar. 15, 2013, now Pat. No. 8,737,426.

(51) Int. Cl.
*H04J 3/06* (2006.01)
*H04L 12/413* (2006.01)
*H04L 12/40* (2006.01)

(52) U.S. Cl.
CPC ............. *H04J 3/0614* (2013.01); *H04J 3/0658* (2013.01); *H04L 12/4135* (2013.01); *H04L 2012/40215* (2013.01)

(58) Field of Classification Search
CPC ................. H04L 2012/40215; H04L 12/4135; H04L 29/0619; H04L 12/413; H04L 12/40013; H04L 12/4625; H04J 3/06; H04J 3/0614; H04J 3/0658; H04J 3/0623; H04J 3/0638; H04J 3/0652

See application file for complete search history.

(56) References Cited

U.S. PATENT DOCUMENTS

5,696,911 A  12/1997 Fredriksson
6,430,164 B1  8/2002 Jones
(Continued)

FOREIGN PATENT DOCUMENTS

EP  2521319  11/2012
EP  2712123  3/2014
(Continued)

OTHER PUBLICATIONS

Adamson, T.; "Enabling Hybrid CAN and CAN FD Networks"; NXP Semiconductors Powerpoint Slides, FD Shield; Oct. 28, 2015; 24 pages.
(Continued)

*Primary Examiner* — Hoang-Chuong Vu
(74) *Attorney, Agent, or Firm* — Fitch, Even, Tabin & Flannery LLP

(57) ABSTRACT

A control network communication arrangement includes a second protocol embedded into a first protocol in a way that modules supporting the second protocol may be aware of and utilize the first protocol whereas modules supporting only the first protocol may not be aware of the second protocol. Operation of modules using the second protocol does not disturb operation of the modules not configured to use or understand the second protocol. By one approach, the messages sent using the second protocol will be seen as messages sent using the first protocol but not having a message necessary to understand or as needing a particular response. In another approach, modules using the second protocol can be configured to send messages within a CAN message frame without being compatible with CAN.

14 Claims, 16 Drawing Sheets

(56) References Cited

U.S. PATENT DOCUMENTS

| | | | |
|---|---|---|---|
| 6,636,100 | B1 | 10/2003 | Shingaki |
| 7,103,688 | B2 | 9/2006 | Strong |
| 7,243,143 | B1 | 7/2007 | Bullard |
| 7,472,216 | B2 | 12/2008 | Fredriksson |
| 7,478,234 | B2 | 1/2009 | Fredriksson |
| 7,711,880 | B2 | 5/2010 | Fredriksson |
| 7,899,936 | B2 | 3/2011 | Fredriksson |
| 7,934,039 | B2 | 4/2011 | Fredriksson |
| 8,065,052 | B2 | 11/2011 | Fredriksson |
| 8,321,612 | B2 | 11/2012 | Hartwich |
| 8,737,426 | B1 | 5/2014 | Fredriksson |
| 8,897,313 | B2 | 11/2014 | Cagno et al. |
| 8,897,319 | B2 | 11/2014 | Fredriksson |
| 2002/0126691 | A1 | 9/2002 | Strong |
| 2002/0141438 | A1* | 10/2002 | Smith ............... H04L 12/40013 370/465 |
| 2005/0105534 | A1 | 5/2005 | Osterling |
| 2005/0251701 | A1 | 11/2005 | Fredriksson |
| 2007/0008904 | A1 | 1/2007 | Ramesh |
| 2008/0195747 | A1 | 8/2008 | Elmaliah |
| 2009/0063909 | A1 | 3/2009 | Fredriksson |
| 2010/0272102 | A1 | 10/2010 | Kobayashi |
| 2011/0013564 | A1 | 1/2011 | Zou |
| 2011/0066297 | A1* | 3/2011 | Saberi ................ F16K 31/046 700/287 |
| 2011/0072123 | A1 | 3/2011 | Hsu |
| 2013/0080585 | A1 | 3/2013 | Schaffner |
| 2013/0172046 | A1 | 7/2013 | Rofougaran |
| 2014/0258571 | A1 | 9/2014 | Hartwich |
| 2014/0280636 | A1 | 9/2014 | Fredriksson |
| 2014/0328357 | A1 | 11/2014 | Fredriksson |
| 2014/0337549 | A1 | 11/2014 | Hartwich |

FOREIGN PATENT DOCUMENTS

| | | |
|---|---|---|
| FR | 2990784 A1 | 11/2013 |
| JP | 2007166423 A | 6/2007 |
| KR | 1020140068908 | 6/2014 |
| WO | 0062486 | 10/2000 |
| WO | 2004019584 | 3/2004 |
| WO | 2012150248 | 11/2012 |
| WO | 2013000911 | 1/2013 |
| WO | 2013000916 | 1/2013 |
| WO | 2013020781 | 2/2013 |
| WO | 2013030095 | 3/2013 |
| WO | 2013164390 | 11/2013 |

OTHER PUBLICATIONS

Miller, C., and Valasek, C.; "A Survey of Remote Automotive Attack Surfaces"; article cited in the Washington Post, approximately Oct. 2015; http://www.washingtonpost.com/sf/business/2015/07/22/hacks-on-the-highway/; 94 pages.

Adamson, T.; "Hybridization of CAN and CAN FD Networks"; NXP Semiconductors; Article, ICC 2015; CAN in Automation; 4 pages.

International Search Report for PCT/US2015/032384 mailed Sep. 7, 2015; 5 pages.

Written Opinion of the International Searching Authority for PCT/US2015/032384 mailed Sep. 7, 2015; 6 pages.

Hartwich, F., et al.; 'The Configuration of the CAN Bit Timing', presented at 6th International CAN Conference; Nov. 2-4, 1999; Turin, Italy; published by CAN in Automation (CiA); Nuernberg, Germany; 10 pages.

Herrewege, V. A., et al.; 'CANAuth—A Simple, Backward Compatible Broadcast Authentication Protocol for CAN Bus'; Ku Leuven Research & Development (University), Belgium; published 2011; 7 pages.

Imran, S., et al; 'Improving information throughput in CAN networks: Implementing the dual-speed approach'; Embedded Systems Laboratory, University of Leicester, University Road, Leicester, LE1 7RH; published 2009; 6 pages.

Robert Bosch GMBH; CAN With Flexible Data-Rate; Apr. 17, 2012; www.bosch-semiconductors.de/media/ pdf_1/canliteratur/can_fd.pdf; 34 pages.

Robert Bosch GMBH; Web Pages 'CAN With Flexible Data-Rate'; Aug. 2011; http://www.bosch-semiconductors.de/media/pdf 1 canliteratur/can_fd.pdf; 14 pages.

Swedish Standards Institute; SS-ISO 11898-1; 'Road Vehicles-Controller Area Network (CAN), Part 1: Data Link Layer and Physical Signalling'; Dated Dec. 5, 2003; Published Jan. 2004; Updated 2006; 51 pages.

Swedish Standards Institute; SS-ISO 11898-1; 'Road Vehicles-Controller Area Network (CAN), Part 1: Data Link Layer and Physical Signalling'; Dated Dec. 5, 2003; Published Jan. 2004; 51 pages.

Ziermann, T., et al.; 'CAN+: A new backward-compatible Controller Area Network (CAN) protocol with up to 16.times. higher data rates'; Hardware/Software, Co-Design, Department of Computer Science, University of Erlangen-Nuremberg; published 2009; 6 pages.

International Search Report for PCT/US2014/027794 mailed Jul. 29, 2014; 9 pages.

Written Opinion of the International Searching Authority for PCT/US2014/027794 mailed Jul. 29, 2014; 15 pages.

* cited by examiner

PRIOR ART

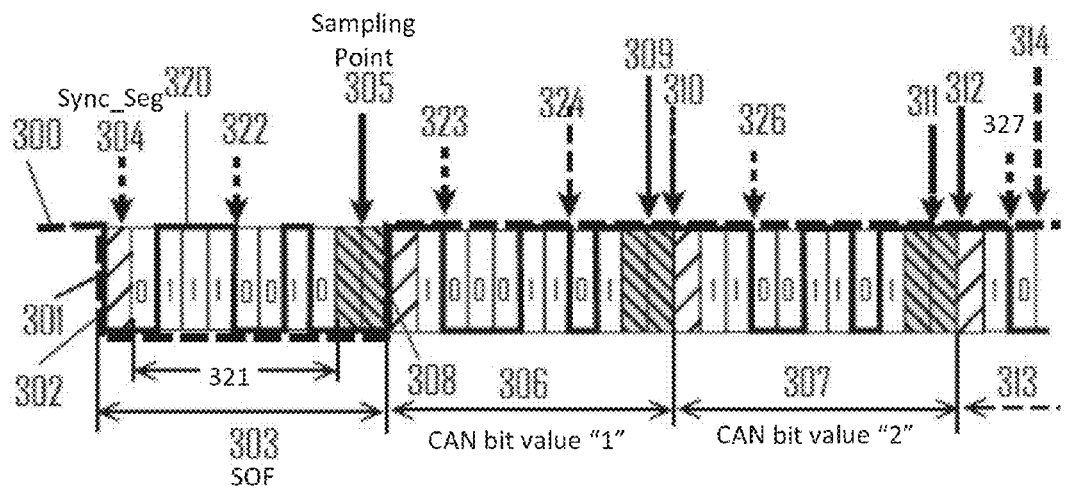
FIG. 6
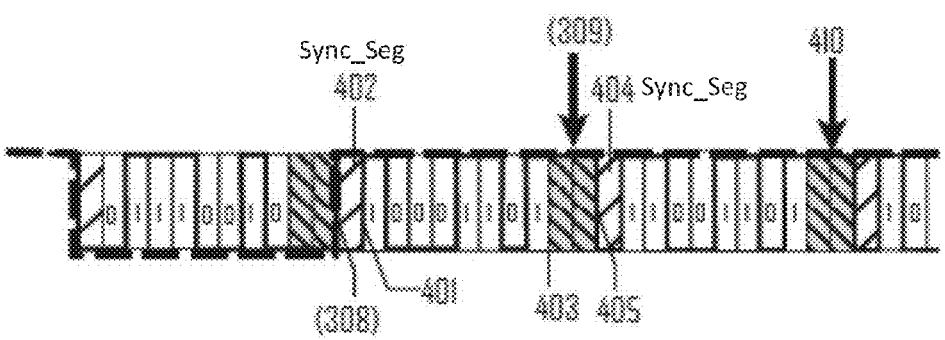
FIG. 7
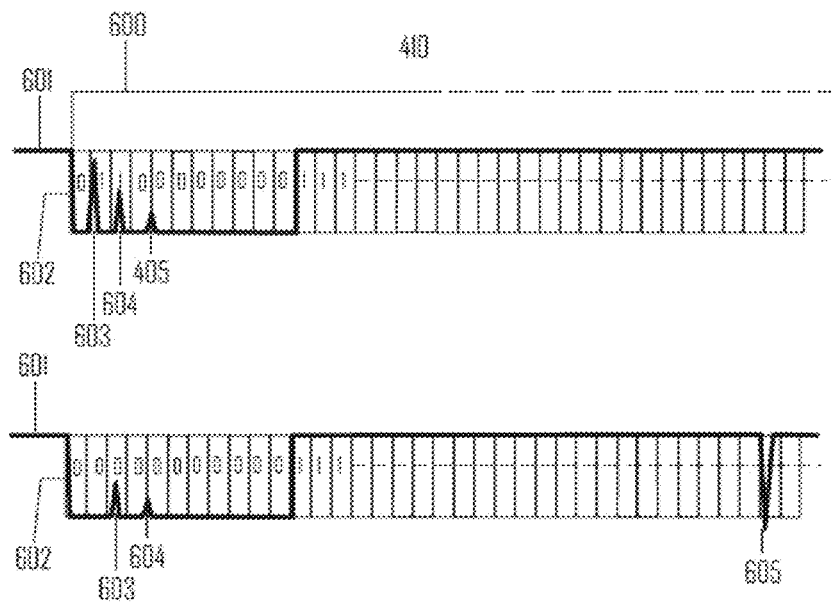
FIG. 8
FIG. 9

FIG. 10
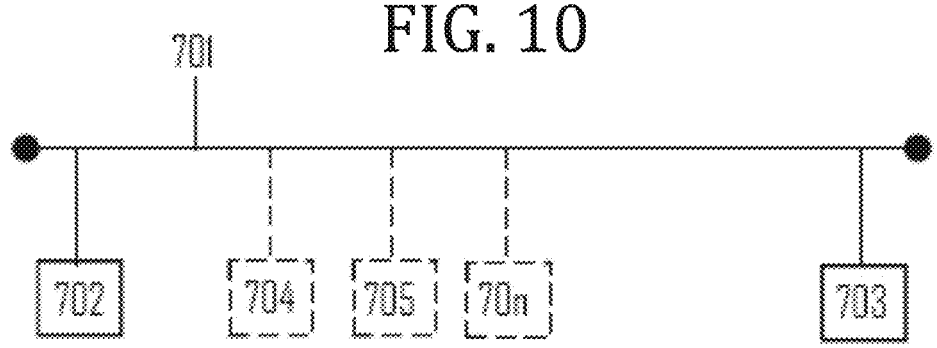
FIG. 11
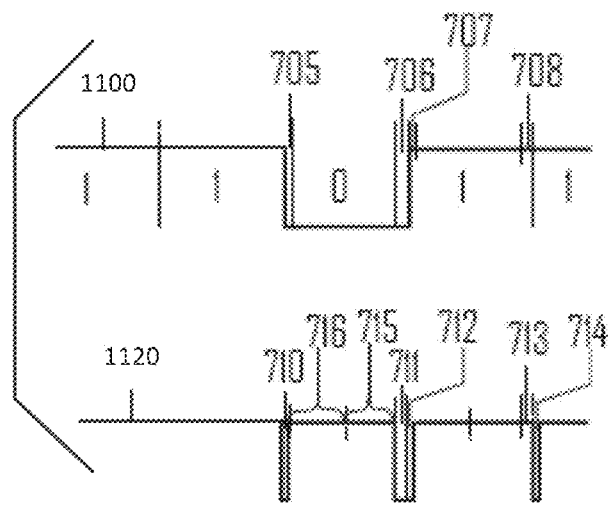
FIG. 12
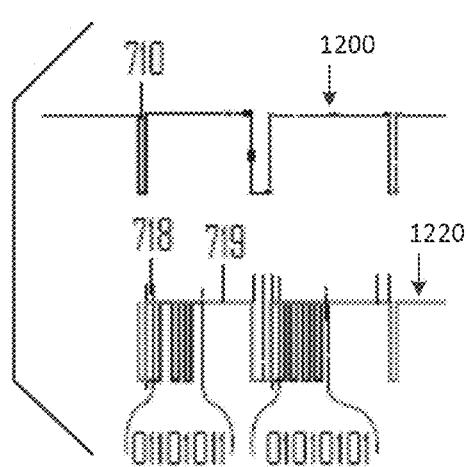
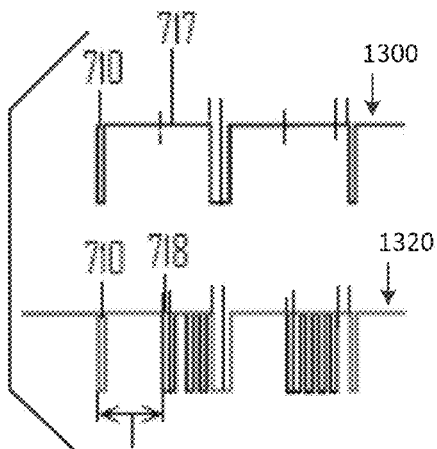
FIG. 13

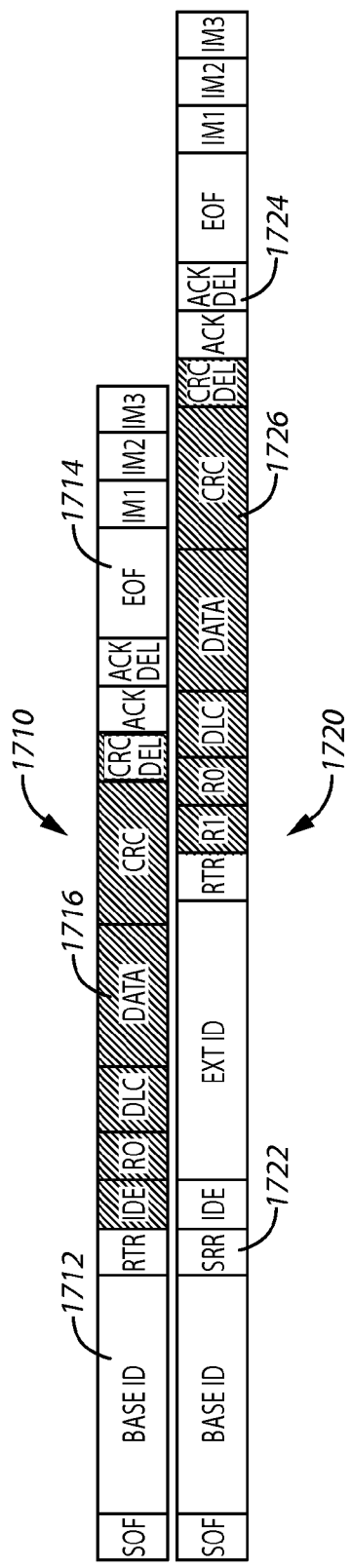
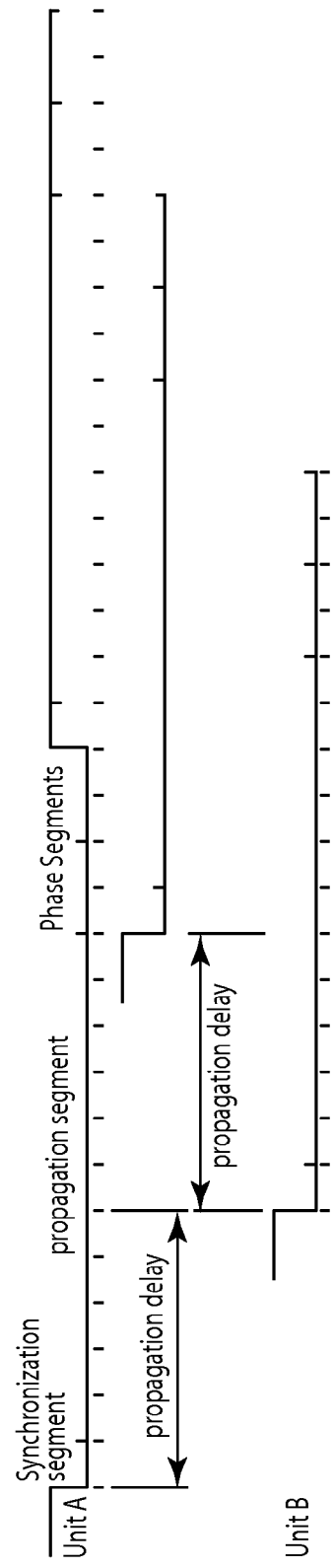
FIG. 17
FIG. 18

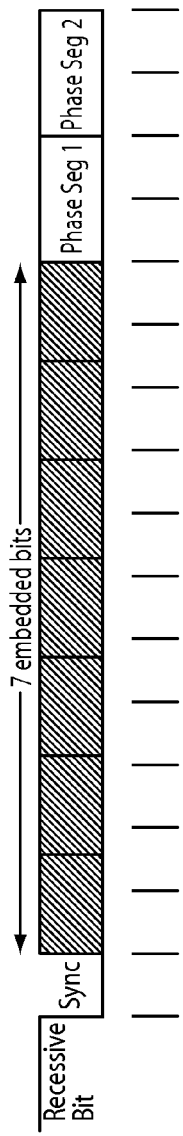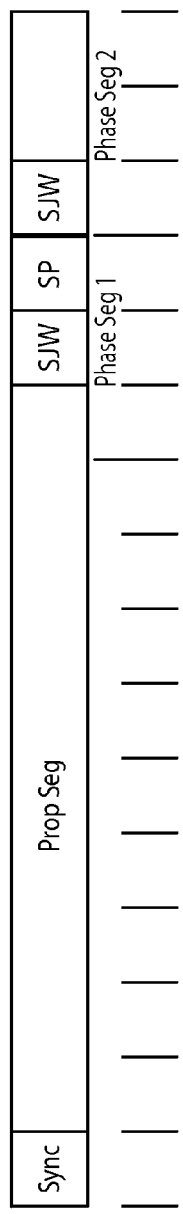
FIG. 21
FIG. 22
FIG. 23

FIG. 30
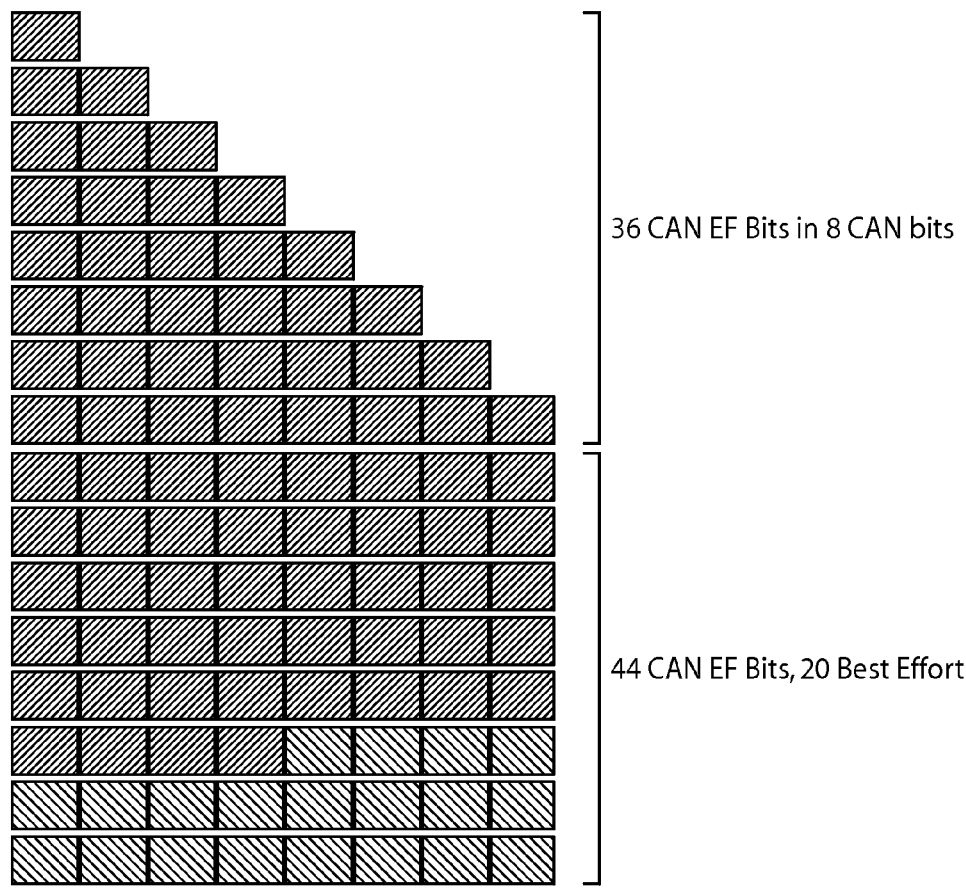
36 CAN EF Bits in 8 CAN bits
44 CAN EF Bits, 20 Best Effort
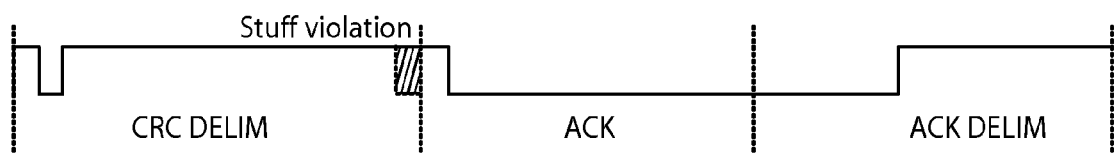
FIG. 31

HIGH SPEED EMBEDDED PROTOCOL FOR DISTRIBUTED CONTROL SYSTEMS

RELATED APPLICATION(S)

This application is a continuation in part of U.S. application Ser. No. 13/965,342, filed Aug. 13, 2013, now U.S. Pat. No. 8,897,319, issued Nov. 25, 2014, which is a continuation in part of U.S. patent application Ser. No. 13/833,238, filed Mar. 15, 2013, now U.S. Pat. No. 8,737,426, issued May 27, 2014, the contents of which are incorporated by reference as though fully re-written herein.

TECHNICAL FIELD

This invention relates generally to electronic communications and more specifically to a high speed protocol for control networks.

BACKGROUND

Electronic devices communicate with each other in a variety of ways, often based upon the requirements of a given context. One such context is that of control systems. Unlike simple communication systems where the system merely allows for communication among the devices communicating on the system, control systems communicate for the purpose of explicit control over the modules connected to communicate over the control system. Such systems then allow other applications to run on the various modules. Those applications in a distributed embedded control systems, however, should work in concert.

To provide that group control, most distributed embedded control systems are built around a communication protocol standard, examples of which include CAN (ISO 11898), SERCOS, FlexRay, EtherCAT, and sometimes even Ethernet among others. Higher layer protocols are embedded on top of the communication standard to provide rules for data exchange among participating applications at Electronic Control Units participating in the control network, timing rules, sequence rules, and the like to facilitate communications between the distributed applications that are exchanging information. CANopen, DeviceNet, SDS, J1939, and NMEA 2000 are just a few examples of protocols that are layered on top of the CAN standard. Even meta protocols like CanKingdom are used, by which higher layer protocols can be constructed and optimized for specific distributed embedded control systems.

Each protocol standard has its own strengths and weaknesses. The ideal communication would have an infinite bandwidth, no latency, and full data integrity. Available communication alternatives are fare from the ideal one and compromises have to be found. For instance, Ethernet has a big bandwidth but poor timeliness due to its handling of message collisions. CAN has an efficient collision resolution but low bandwidth and no synchronization support. SERCOS is fast but all nodes have to support the communication requirement of the most demanding node in the system. Accordingly, one big difficulty when designing a distributed embedded control system is to choose the basic communication system to fit the given system's needs. Another complication is that different parts of a system often have different needs. Some parts may involve advanced feedback loops requiring accurate time synchronization and short latencies while other parts may not be time critical at all but instead depend on a correct sequence of events. In another example, a system may during runtime conditions work well with a communication protocol with low bandwidth but would need a high bandwidth for re-flashing modules in a maintenance mode. Moreover, industry requires a number of development and analyzing tools and pool of engineers with an in depth familiarity with the chosen communication protocol to find the correct compromises. To apply the given technologies in a way to take advantage of the good properties of a protocol and to minimize its shortcomings typically requires a long time of practical experience in design and maintenance of distributed embedded control systems based on the chosen protocol and its associated tools.

In the example of CAN systems, the CANFD protocol has been developed in an attempt to address the CAN protocol's data bandwidth limitations. This system, however, is not backward compatible with previous CAN-based modules. Accordingly, modules using the CANFD protocol cannot be installed into a control network having CAN-based modules and effect communication with those modules. Another shortcoming is that the CANFD protocol is based on the modules' looking for a given set point in time, which requires the modules to have highly accurate clocks and processors. Specifically, CAN-FD requires a switch from a first bit-rate to a second bit-rate relative to an edge in combination with the sample point location. This solution demands stable clocks over the time from the edge to the sample point and a common location of the sample point in the definition of the first bit-rate. To get a precise definition of the sample point limits the possible clock frequency that can be used to run the CAN-FD controller. Moreover, although speed is improved over previous CAN-based systems, the maximum message length is still limited to 64 bytes. Such a system lacks in flexibility for system designers.

Moreover, CANFD may present some implementation challenges for current users of CAN-based control systems. In one example, the automotive industry uses CAN-based modules for communication among various elements in a vehicle. Given the nature of the automotive business, simply changing one module in a vehicle's system can be very expensive. Given the challenges facing integration of CANFD modules with CAN modules, to introduce one CANFD module would force an auto maker to either change every module in a given vehicle to CANFD (and absorbing the many multiples of cost to design, build, and test every new module) or split a vehicle's communication bus into two: one running CAN and another running CANFD. Thus, there is a need for a technology that can allow for introduction of CANFD modules gradually over time, such as in the automotive industry, to pre-established CAN-based system to lower the barrier to entry that might otherwise face CANFD modules.

SUMMARY

Generally speaking, pursuant to these various embodiments, a second protocol is embedded into a first protocol in a way that modules supporting the second protocol may be aware of and utilize the first protocol whereas modules supporting only the first protocol may not be aware of the second protocol. Operation of modules using the second protocol does not disturb operation of the modules not configured to use or understand the second protocol. By one approach, the messages sent using the second protocol will be seen as messages sent using the first protocol but not having a message necessary to understand or as needing a particular response. In another approach, modules using the second protocol can be configured to send a message during transmission of first protocol messages by other modules, the second protocol messages being triggered off of expected aspects of the message sent under the first protocol.

In one particular example, the first protocol may be CAN protocol, and the second protocol is a protocol that embeds bits into portions of the CAN protocol. For example, bits of a CAN protocol typically include several bit quanta, and the CAN protocol operates by looking for particular signal levels at particular portions or bit quanta of the individual bits. By one approach, therefore, the second protocol can include sending additional information within the CAN message packet using bit quanta of Prop-Seg bits of the CAN message packet other than the defined bit quanta.

The second protocol information is embedded such that falling edges of bits in the second protocol will not interfere with normal operation of modules only understanding the first or CAN protocol. This can be done, for example, by effecting synchronization of modules using both the first and second protocols with a portion of the message packet. Using this approach can allow modules using the second protocol to use messaging controls of the first protocol message that is carrying the second protocol message to control the second protocol message thereby increasing the amount of data that can transmitted with a single second protocol message.

These teachings are scalable such that multiple modules on a single common control network can be using multiple different kinds of embedded protocols within the first protocol. Moreover, modules using the second protocol can be installed into a control network using older modules configured to only use the first protocol, thereby allowing significant flexibility in upgrading portions of an existing control network.

Such benefits can be envisioned in the example of implementation in an automotive industry setting. Here, new modules can be configured to operate using the CAN standard, a second protocol as described herein, and the CANFD protocol. Such modules can be introduced to otherwise stable CAN-based communication buses and increase communication speed through use of the second protocol. Over time, after all the old CAN modules are replaced, the modules can communicate using the CANFD protocol to provide a uniform, high speed communication environment. In this way, adoption of modules using the CANFD protocol can proceed immediately without the attendant concerns regarding incorporation of CANFD modules into communication busses having old CAN modules.

These and other benefits may become clearer upon making a thorough review and study of the following detailed description.

BRIEF DESCRIPTION OF THE DRAWINGS

FIG. 6 comprises a schematic of another example of embedding a second protocol message in a portion of a first protocol CAN-based message as configured in accordance with various embodiments of the invention;

FIG. 7 comprises a schematic of an example of embedding a second protocol message in a portion of a first protocol CAN-based message with a Sync_Seg portion set as dominant as configured in accordance with various embodiments of the invention;

FIG. 8 comprises a schematic of an example of how a module operating using a second protocol message within a portion of a first protocol CAN-based message as configured in accordance with various embodiments of the invention may interpret a received message with a signal distortion;

FIG. 9 comprises an example of how a second module operating using a second protocol message within a portion of a first protocol CAN-based message as configured in accordance with various embodiments of the invention may interpret the received message of FIG. 8 with a different signal distortion;

FIG. 10 comprises a block diagram of an example control network as configured in accordance with various embodiments of the invention;

FIG. 11 comprises a comparison of schematics of an example message sent from one module and how that message is perceived by a second module as configured in accordance with various embodiments of the invention;

FIG. 12 comprises a comparison of schematics of an example message sent from one module and how a second module transmits a message in a second protocol in response to receipt of the example message as configured in accordance with various embodiments of the invention;

FIG. 13 comprises a comparison of schematics of an example message sent from one module and how a second module transmits a message in a second protocol in response to receipt of the example message as configured in accordance with various embodiments of the invention;

FIG. 17 comprises schematics of a CAN bit and an extended CAN bit with portions highlighted to illustrate where CAN-EF bits can be implemented as configured in accordance with various embodiments of the invention;

FIG. 18 comprises time lines of communications between two modules A and B showing propagation delays;

FIG. 21 illustrates where CAN-EF embedded bits can be sent within the CAN transmission of FIG. 20;

FIG. 22 illustrates the sampling point (SP) and synchronization jump width (SJW) ranges for a CAN transmission;

FIG. 23 illustrates modified sampling point (SP) and synchronization jump width (SJW) ranges for a CAN transmission in accordance with various embodiments of the invention;

FIG. 30 illustrates an example transmission of 80 CAN-EF bits using two CAN bytes as configured in accordance with various embodiments of the invention;

FIG. 31 illustrates a transmission sequence where the CRC DELIM portion of a transmission forces a stuff violation as configured in accordance with various embodiments of the invention;

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
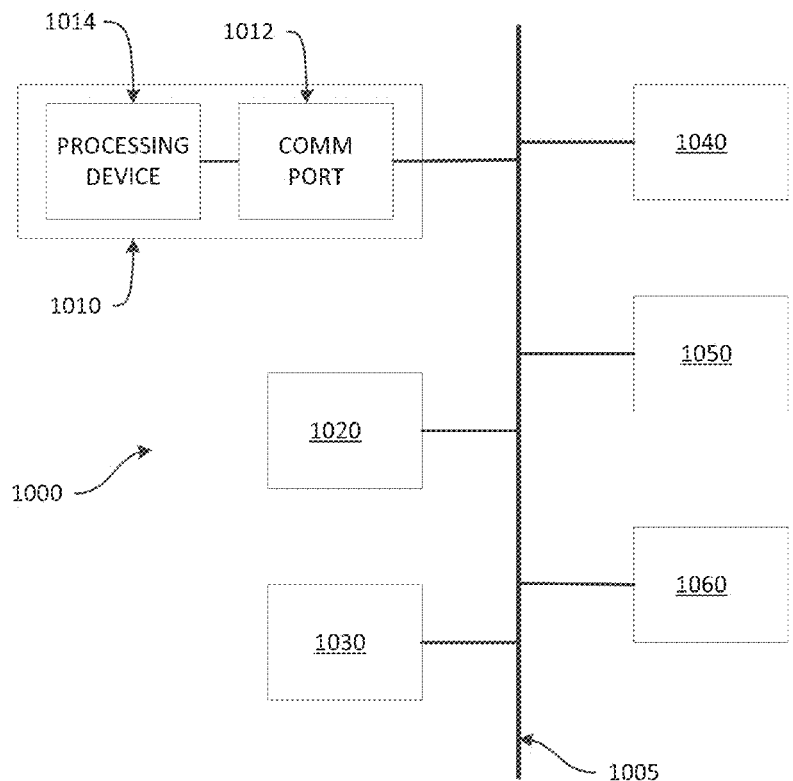
FIG. 1 comprises a block diagram of an example control network as configured in accordance with various embodiments of the invention.

Referring now to the drawings, and in particular to FIG. 1, an illustrative system that is compatible with many of these teachings will now be presented. In FIG. 1, a control network 1000 is illustrated having various devices communicating over a bus 1005, but these teachings can apply to control networks having any of a variety of topologies. The communication device apparatus 1010 can be considered a module or node on the control network 1000 and include a communication port 1012 configured to connect to a control network 1000 according to the control network's topology. The communication device apparatus 1010 also includes a processing device 1014 operatively connected to the control network 1000 to control receiving and sending communications over the control network 1000 via the communication port 1012. Those skilled in the art will recognize and appreciate that such a processor can comprise a fixed-purpose hard-wired platform or can comprise a partially or wholly programmable platform. All of these architectural options are well known and understood in the art and require no further description here.

By one approach, the processing device 1014 is configured to communicate, during transmission of a message packet over the control network 1000 according to a first protocol, a second message embedded within the message packet using a second protocol. For example, the processing device 1014 is further configured to effect synchronization with a second communication device 1020, 1030, 1040, 1050, 1050, and/or 1060 over the control network 1000 for the first protocol and the second protocol based on at least a portion of the message packet. In another approach, the processing device 1014 supports both the first and second protocols and uses both protocols when communicating with communication devices 1020 and 1050, which also support both the first and second protocols, whereas communication devices 1030, 1040, and 1060 only support the first protocol. In this example, any information in the messages according to the second protocol will be interpreted as noise and will be ignored by the communication devices 1030, 1040, and 1060 running only, and as defined by, the first protocol.

An example implementation of embedding the second protocol message in the first protocol message will be described with reference to FIGS. 2-10 in the context of a CAN based system. The Controller Area Network (CAN) standard (International Standards Organization (ISO) 11898) is a commonly used protocol for distributed embedded control system although these general teachings can be applied on other protocols as well.

Figure 2:
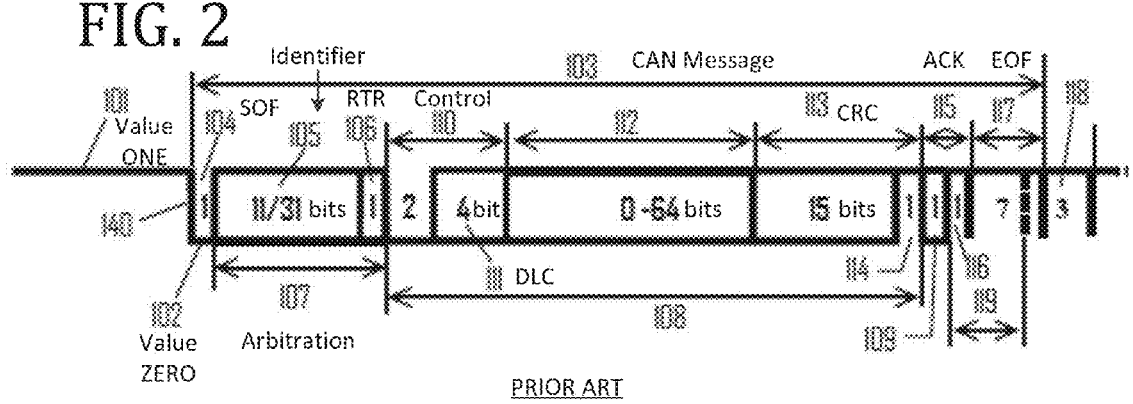
FIG. 2 comprises a schematic of a CAN message.

In this implementation, modules supporting the CAN protocol ISO 11898 can coexist with modules supporting a second protocol on the same bus by abstaining from taking advantage of one or more features of CAN. FIG. 2 shows some main characteristics of CAN. CAN is designed for a bus topology and works with two voltage levels, no voltage 101, representing the value "one," and voltage 102 representing the value "zero." This arrangement implies that a zero is dominant over a one; in other words, if a first transmitter transmits a one and a second transmitter a zero at the same time, then only the zero can be detected. An idle bus can be seen as a continuous stream of ones. A message 103 starts with a zero bit, the Start Of Frame (SOF) 104 followed by an Identifier 105 of eleven (Standard) or 29 (Extended) plus 2 protocol bits (totaling 31 bits) and a Remote Transmit Request (RTR) bit 106. The SOF and Identifier message portions constitute the Arbitration field 107 where bus collisions are resolved by bitwise arbitration. During the remaining part of the message 108 until the Acknowledgment bit (ACK) 109, there is only one transmitter on the bus because the other transmitters are controlled to not be active in response to these initial message portions; specifically, after the arbitrations portions of the message, ending with the RTR, only one transmitter will be sending while all other communication units will only receive bits per the protocol. This remaining part of the message 108 starts with a Control Field 110 with two dominant bits and a four bit Data Length Code (DLC) 111 indicating the length of the following Data Field 112, which can contain no data (DLC=0) or up to eight bytes (DLC=8). In other words, the Data Field 112 of the standard CAN message can be from 0 to 64 bits long. The message so far is checked by a 15 bit CRC code placed in the sixteen bit CRC field 113, where the last bit is the CRC delimiter 114. The ACK field 115 contains the ACK bit 109 followed by a recessive bit, the ACK delimiter 116. The remaining part of the message 103 is the End Of Frame (EOF) field 117 containing seven consecutive recessive bits. Three recessive bits, the Intermission 118, have to pass before the bus is free for new messages.

Figure 3:
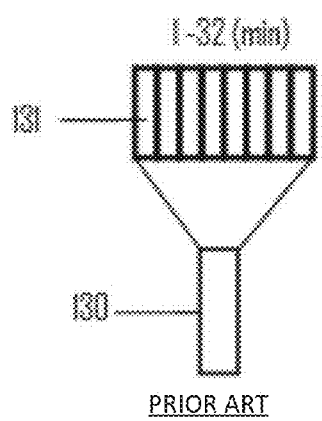
FIG. 3 comprises a schematic of an example CAN time quantum.

According to the CAN specification (ISO 11898-1), a bit is constructed of time quanta. With reference to FIG. 3, a single bit quantum for the standard CAN message is depicted as time quantum 130, which is a fixed unit of time derived from the oscillator period 131 of the transmitter/receiver's clock. The time ticks 131 may alternatively be derived from a separate oscillator or clock. A programmable prescaler with integral values ranges from at least one to thirty-two to define the time quantum as a given number of a minimum time quantum. Accordingly, starting with the minimum time quantum, the time quantum shall have the length of Time quantum=m·minimum time quantum where m is the value of the prescaler.

Figure 4:
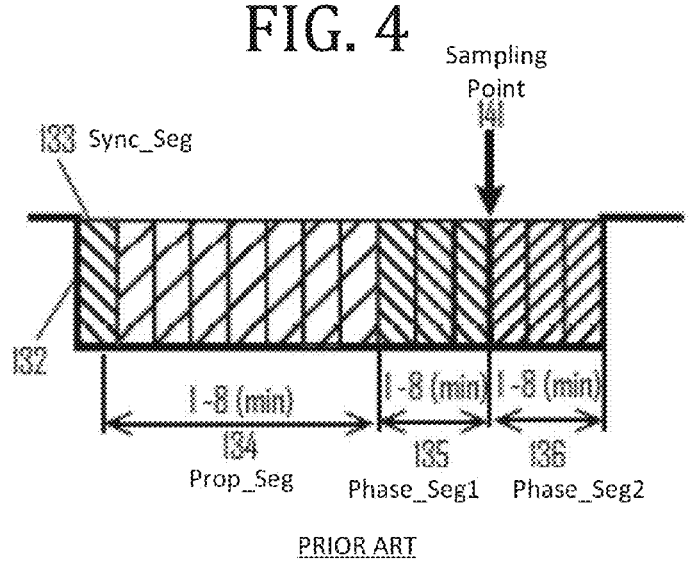
FIG. 4 comprises a schematic of an example CAN bit.

In operation, therefore, another example CAN bit 132 as illustrated in FIG. 4 is constructed of individual time quanta. The first time quantum is the Sync_Seg 133 followed by the Prop_Seg (Propagation Segment) 134 consisting of one up to at least eight time quanta. The propagation segment is defined according to a period of time to make sure a signal wave can propagate from the transmitter to the far end of the bus and back, which would also correspond to the amount of time needed for the furthest module on the control network to receive the message and respond. Accordingly, the Prop_Seg length is set to allow for the bit arbitration aspect of the CAN protocol to work. The final part of the CAN bit 132 includes the Phase Segments, Phase_Seg1 135 and Phase_Seg2 136. The phase segments are symmetrical, each having one or up to at least eight time quanta long. The phase segments take up the time skew between the different nodes in the system. A CAN bit should then be programmable from 4 to at least 25 time quanta.

All clocks in a CAN system are assumed to be unsynchronized. When a SOF 104 is transmitted, each module's clock is synchronized to the falling edge 140, and each module counts the number of time quanta specified for Prop_Seg and Phase_Seg1. For example, the internal clock of a module that receives the falling edge can determine the timing of the expected sampling point within the resolution of that internal clock; i.e., by knowing the definition of the bits in the internal clock the module can calculate the location of the sampling point relative to the internal clock. In CAN this is typically done by time quanta unit where each time quanta is a number of local clock elements. The voltage of the signal is measured at the Sampling Point 141. If the voltage is still present, the module decides that a SOF is detected and the following voltage shifts are decoded according to the CAN specification. If there is no voltage at the Sampling Point 141, the falling edge is regarded as a glitch and ignored. This feature can be seen as a low pass filter, filtering out disturbances on the bus, for example, due to wave reflections. Such features make CAN dependable and forgiving in bad wiring installations.

Voltage edges can radiate high frequencies in certain communication systems, thereby causing electromagnetic compatibility (EMC) problems. To reduce such problems, CAN specifies a Non Return to Zero (NRZ) decoding of bits, in other words, consecutive bits of the same value do not generate any edges; instead, the bits are decoded by dead reckoning. The individual modules' clocks are resynchronized on falling edges only, defined as transitions from recessive (1) bits to dominant (0) bits. CAN has a bit stuffing rule that after a sequence of five consecutive bits of the same value, a stuff bit of opposite value shall be inserted to make sure that resynchronizations will take place. Thus a resynchronization will take place at least after ten bits during normal conditions. The CAN specification demands the Sampling Point to stay within the phase segments for at least 13 bits.

More elaborate information about CAN can be found in the ISO standard 1898 and the article "The Configuration of the CAN Bit Timing" by Florian Hartwig and Armin Bassemir (Robert Bosch GmbH, Abt. K8/EIS), presented at 6th International CAN Conference 2nd to 4th November, Turin (Italy), published by CAN in Automation (CiA), Nürnberg Germany, which materials are incorporated by reference in their entireties herein.

Figure 5:
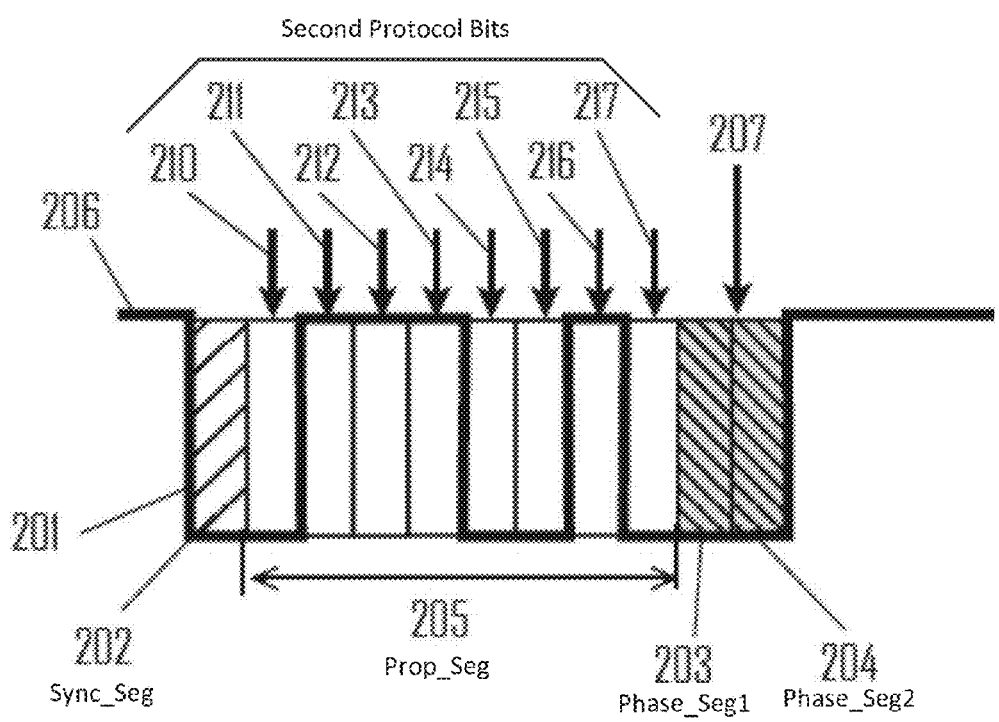
FIG. 5 comprises a schematic of an example of embedding a second protocol message in a portion of a first protocol message, here a Prop_Seg portion of a CAN message, as configured in accordance with various embodiments of the invention.

Turning to FIG. 5, one example solution to the bandwidth problem is to modify a first protocol, here the CAN protocol, to embed a second high speed protocol in portions of a standard CAN message. In such an approach, a processing device of a control network module can be configured to control the second protocol to use a bit rate higher than the first protocol's bit rate, for example, to control the second protocol to use a bit rate having an integer multiple higher than the first protocol's bit rate. Alternatively, the second protocol bit rate may also have a rate having a non-integer multiple higher that the first protocol. For example, a first protocol may have a bit-rate of 100 bits/second, and the second protocol may have a bit-rate anywhere from 400 bits/second to 6 Mbit/second. The bit rate will be (number of second protocol bits in every first protocol bits)/((propsegment length in time)×utilization) bits/second. The rate of bits in the second protocol is only limited by the clock resolution in the second protocol control logic. The number of bits in each time quanta can for example be 20 per 3 time quanta. In any event, the effect is that the processing device is configured to implement the second protocol by adding bits inside of individual bit quanta of the first protocol. In other words, a CAN message packet can be defined by bits having a plurality of bit quanta, and data for the CAN message packet is defined by a signal level at defined bit quanta of a bit where the defined bit quanta are less than every bit quanta of a bit. For instance, a standard CAN bit uses defined bit quanta including a first bit quantum of a respective bit, which first bit quantum is a Sync_Seg bit, and a sample point bit quantum of the respective bit. That sample point is typically between the Phase_Seg 1 and Phase_Seg 2 portion of the bit as illustrated in FIG. 4. The remaining, undefined bit quanta are available for use in the second protocol. Thus, in one example, to embed the second protocol, the processing device is configured to send additional information within the CAN message packet using bit quanta of Prop-Seg bits of the CAN message packet other than the defined bit quanta checked by the nodes using the standard CAN message protocol.

In the FIG. 5 example, the second protocol message is embedded in the Prop_Seg of CAN bits transmitted in a CAN message after the Arbitration field of the CAN message. The Propagation Segment is only of use during the arbitration part of a CAN message exchange between nodes. More than one module can be transmitting simultaneously during the arbitration period that may result in fluctuating bit timing or bit timing recognition issues caused by different modules communicating at about the same time thereby creating conflicts to be resolved by arbitration and/or by bad clocks in one or more of the modules. After the arbitration period only one module is transmitting and the bit timing on the bus reflects the oscillator of the transmitter. So configured, the second message may be embedded in the time quanta of Prop_Seg of such CAN bits without concern of being lost to collision noise on the control network. Moreover, a module that is not configured to receive messages in the second protocol will not be looking for signal changes during the Prop_Seg of such bits such that signal variations in this portion of the message will not adversely affect such modules. Accordingly, the processing device is configured to implement the second protocol by adding bits inside of individual bit quanta of the first protocol not measured to be a particular level according to the first protocol.

More specifically, FIG. 5 shows an example CAN bit with a Propagation Segment 205 of eight time quanta and two phase segments 203 and 204 of one time quantum each. The bit starts with the Sync_Seg 202 where any voltage shift 201 is done during this time. The voltage level over the bit time is depicted by the bold line 206. The modules supporting the second protocol would use the Prop_Seg for an embedded high speed bit stream by sampling the voltage value of each time quantum and decode the value according to the CAN rules, where a sensed voltage is decoded as zero and no voltage as one. Modules supporting only the original CAN protocol would decode the falling edge 201 as asynchronization or resynchronization edge and ignore the following voltage shifts. The voltage level at the sample point 207 is dominant and the CAN module will decode the bit correctly to a zero. Modules supporting the second protocol would decode the sample points 210 to 217 as follows: 210=0; 211=1; 212=1; 213=1; 214=0; 215=0; 216=1; 217=0. Here, the processing device for the module is configured to use same voltage levels for signal designations for both the first protocol and the second protocol, although this is not necessary. Indeed, the processing device may instead be configured to implement the second protocol by adding bits inside of individual bit quanta of the first protocol not measured to be a particular level according to the first protocol. Also, although the width of the illustrated second protocol bits or sample points are illustrated as having the same width of first protocol sample points, other time lengths different from that of the first protocol sample points are possible. The number of second protocol bits place in the propagation segment is only limited by the physical layer performance and the clock resolution in the controller logic handling the second protocol.

FIG. 6 illustrates an example of embedding a second protocol message through a whole first protocol CAN based message. The dashed line 300 shows the voltage level on a bus as interpreted by CAN starting with an idle bus. The solid line 320 shows the voltage levels of the second protocol embedded into the standard CAN message as described above. The falling edge 301 is indicating a Start Of Frame (SOF) bit 303. The falling edge is detected in the Sync_Seg 304, and the value of the bit is verified at the sample point 305 by a module supporting the original CAN protocol. It disregards any additional falling edges such as the edge 322 after the initial edge 302. A module supporting the second protocol would read 0 1 1 1 0 0 1 0 in the bit sequence 321 embedded in the CAN bit. The two first CAN bits 306 and 307 after SOF have the value 1 1. The edge 308 at the beginning of bit 306 is a rising one, thus not affecting the CAN resynchronization. The embedded second protocol transmits 1 0 0 0 1 1 0 1 in this CAN bit 306, including generating a falling edge 323. The CAN module will disregard this edge as well as the following edge 324 because it is not looking for edges at these points and will not resynchronize because it sampled a dominant level at the Sampling Point 305. The CAN module will correctly sample a recessive level at point 309, assume the next bit 307 to start at point 310, and calculate the position of the sample point 311.

In this example, however, the second protocol will generate a falling edge 326 two bit quanta from the assumed start 310 of bit 307, which will cause the CAN module to then resynchronize and move the sampling point one bit quantum to 312 (as the Phase_Seg for this example is only one bit quantum long). The CAN module will still correctly sample the bit value as 1 but at a false position in the CAN message used by the transmitting module supporting the second protocol. The next falling edge 327 in the following CAN bit 313 would move the CAN sampling point another time quantum and into the wrong bit. Then it could wrongly sample a dominant level generated by the second protocol as indicated by 314.

To avoid this error, the processing device for the module operating under the second protocol is configured to set a Sync_Seg bit quantum as dominant, for instance, after recessive samples in the first protocol. The drawback of this rule is that it will introduce more falling edges in CAN messages compared with the original CAN protocol, but any high speed protocol would similarly create additional falling edges. In one example of this approach, stuff-bits are used in the first protocol to secure a resynchronization edge at least every 10 bits. With this new edge generator, resynchronization will occur on every recessive bit and never after more than 6 bits. With such an arrangement, the example system can run with clocks with 66% less tolerance. One potential drawback in such an approach is that benefits may be realized only where all messages are sent with this extra edge in the synch segment, and this approach may not work if the messages are sent according to the first protocol. This feature can also be used to move the sample point in the first protocol out of the propagation segment. By having the first byte in the first protocol with only recessive bits, it is possible to have eight edges that will move the sample point at least eight time quanta out of the propagation segment. This will not cover all cases because a propagation segment could have more than eight time quanta in the propagation segment. In most cases this should be more than enough and other implementations can be programmed to cover any setting used in the first protocol.

FIG. 7 shows the same message as FIG. 6 but with the new rule of the second protocol applied. The anticipated rising edge 308 is now replaced by the rising edge 401 of the second protocol as the Sync_Seg 402 is dominant. The second protocol could have moved the rising edge all the way to Phase_Seg1 at 403 and the CAN module would still have sampled correctly at 309. The Sync_Seg 404 will generate a falling edge 405 that will resynchronize the CAN modules and they will correctly sample a 1 at the sample point 410. Using such an approach illustrates one way the processing device for a module operating the second protocol can be configured to effect synchronization with the second communication device over the control network for both the first protocol and the second protocol based on a same portion of the message packet including one sent according to a CAN protocol.

Referring back to FIG. 2, the part 108 from the Arbitration field 107 to the Acknowledgment bit 115 contains 86 CAN bits where a second protocol can be embedded. With an embedded protocol implemented according to the example above, an additional 86 bytes could be added to an 8 byte CAN message. In one approach, the embedded protocol can include a cyclic redundancy code (CRC) sum of some 24 bits. Also, the last of these bits have to be reserved for transmission of an error frame in case of a faulty CRC sum. If a 24 bit CRC sum is regarded sufficient for 89 byte data from an embedded protocol, then an eight byte CAN message could transfer 97 bytes of data, increasing the bandwidth of a CAN communication 12 times. By a further example approach, the processing device is configured to use CRC bits of the CAN message packet as a quality control check for the CAN message packet and to use bit quanta of CRC bits other than the defined bit quanta for the standard CAN message for a quality control check for the additional information sent using the second protocol within the CAN message packet. In this manner, where the second protocol is implemented such as in the example of FIG. 5 above using bit quanta of a Prop_Seg portion of a bit not otherwise used by the original CAN protocol, that same unused or undefined bit quanta of the CRC bits for a standard CAN message can be used as error checking information for the information sent using the second protocol. In one such approach, a longer CRC field is chosen that is suitable for the longer data of the embedded protocol, for instance, a 21 bit CRC. This can be more efficient for messages that should be received only by nodes using the second protocol. In one such example, the data field of the basic CAN message should contain only recessive bits where the appearance of CAN stuff bits and the CAN CRC bits are then known a priori as well as the total number of the bits in the message independently of the data in the message. The CRC of the second protocol is then placed as far as possible from the SOF in the CAN message such as ending two bits from the End Of Frame bit. In case of a CRC mismatch, a CAN Error Flag can be sent in the bit before the EOF bit to trigger every CAN node in the system to reject the message. Implementing a rule that the Sync_Seg of each CAN bit has the opposite value of the respective bit value, i.e., the Sync_Seg of recessive bits are dominant and vice versa, would create more synchronization flanks for an embedded protocol. More synchronization flanks would allow a higher bit rate of the embedded protocol, which higher bit rate can also be used to improve the CRC-protection of the first protocol. The definition of the first protocol has some disadvantage due to the calculation of the CRC in combination of the stuff-bits. The second protocol may solve this concern by using a different definition of the CRC calculation. By adding only one extra bit in the second protocol and setting this bit in the propagation segment identical to the value of the sampling point of the first protocol, two CRC-calculations are made in parallel with one according to the first protocol and another using a second improved CRC according to the second protocol. By including the second protocol CRC in the propagation segment of the first protocol CRC-bits both will be sent in parallel. The units supporting only the first protocol will not use the second protocol CRC-information and will not detect any problem, but all second protocol units will check both CRCs in parallel and generate an Error-Frame; if not, both are correct. In still another approach, a first protocol message can be re-sent in its entirety within the second protocol portion of the CRC bits to act as a further check on the accuracy of the received first protocol message.

In the example, the amount of eleven bit quanta was chosen to constitute a CAN bit. Eighteen bit quanta could have been chosen to embed two bytes in each CAN bit. The bandwidth could then be increased 24 times. The CAN specification states that a bit should be programmable to at least 25 bit quanta, so the bandwidth could be increased even more, such as by using 35 or 67 bit quanta for a bit. The limit is set only by the quality of the clocks, transceivers, and cabling of the system in use. So configured, one advantage is that protocols like CAN can be gradually enhanced as new module designs can take advantage of more modern and sophisticated components and still be fully backwards compatible in systems with legacy modules.

Starting from the above framework, many modified approaches can be used to fit various control network design needs.

In one example, U.S. Pat. No. 7,711,880 titled "Schematizing of messages in distributed control and supervision system" and incorporated herein by reference describes several ways to design CAN systems in a way that collisions are avoided such as by combining scheduling of messages and the CAN collision resolution mechanism. The CanKingdom protocol describes how to build up a protocol from protocol primitives. Any CAN system has a limited number of messages. Assuming that the number of such messages is in the range between 128 and 256, the arbitration field could be limited to one byte. The RTR bit CAN protocol primitive is optional and may not be used in this example. Moreover, the two reserved bits in the Control field do not contribute where a system specific protocol is created and legacy CAN modules do not participate. The DLC field can be modified and then allow for defining 16 different lengths of the data field according to a given need.

If such approaches are employed in a given control network, then the Arbitration field 107 for CAN messages on that network can be used by the embedded protocol. In this approach, the processing device for a module operating the second protocol is configured to use complete or partial collision avoidance for the CAN-based first protocol and to embed at least a portion of the second message in an arbitration portion of the message packet. This would add another 12 or 32 embedded bytes to a CAN message as implemented in the example above, such that 109 or 129 data bytes can be included in one CAN transmission.

In another example, the maximum bit rate of a CAN communication is limited by the bus length. U.S. Pat. No. 5,696,911 titled "Arrangement for eliminating malfunction and/or permitting high-speed transmission in a serial bus connection, and transmitter and receiver units linked to the latter" and incorporated herein by reference describes how a higher bit rate can be used when some modules can be turned into a silent mode, and thus not fully participating in the CAN error protection procedure. By applying an embedded protocol as described above into such a system, the bandwidth of the communication could be increased another order of magnitude.

In yet another example, CAN may be used to be a carrier frame for other new protocols. Some CAN higher layer protocols are not backwards compatible with CAN-FD and may not be able to integrate a high speed protocol into the standard. One such protocol is the well-known SAE J1939. A solution to this problem includes assigning a few specific CAN identifiers with fixed CAN fields for the sole purpose of being a carrier frame of the new protocol. The first three bits of a J1939 frame are ignored by receivers and used to form seven transmission priority levels (J1939/21, 5.2.1). The value $011_b$ (3) is reserved for control messages and the value $110_b$ for all other informational, proprietary, request and ACK messages. Then the value 001 could be assigned to carry the new protocol. The following CAN bits should all be ones (recessive) to provide a well-defined frame with all CAN bits including CAN id, stuff bits, RTR bit, control bits, HLP bits, CRC bits, and the like known a priori. Every CAN bit after 001 can then be used for embedding the new protocol. Alternatively, if a low priority level would be preferred, then the first five CAN identifier bits should be 11101, followed by ones carrying the new protocol. The suggested solution will also give the maximum resynchronization opportunities for the embedded protocol by the earlier suggested Sync_Seg modification. Regarding synchronization, a module losing arbitration can be sampling received bits at a wrong position because it did not make a hard synch at the winning module's falling flank such as where it could have started its transmission just before reception of the falling flank of the winning node's SOF. Some of the first recessive bits in the CAN identifier may then be used solely (i.e., not carry any bits of the new protocol) to force receiving nodes to re-synchronize enough to get the right position of their sampling points.

Moreover, the second protocol can be implemented in any of a variety of ways. In the example above, the embedded protocol has a NRZ bit coding but it could have been coded in another way, such as manchester or miller coded. In a case where the processing device is configured to implement the second protocol by using an encoding method based on CAN, additional advantages can be realized, especially where the first protocol is CAN based. In such a situation, systems could be gradually upgraded. Some CAN higher layer protocols use only a few CAN identifiers and extend the identification into one or two of the data bytes. CanKingdom is an example of such a protocol. It uses the CAN_Std. ID 0 for setup messages and each node has one CAN ID for response messages. In such an approach, the setup time for a control network could be significantly shortened for the modules supporting the embedded protocol because all setup instructions to the module could be carried in one message with all responses to the instructions sent by the module in another message. More specifically, the processing device for the module is configured to receive a setup message and derive from the setup message information sufficient to configure the first protocol for communication over the bus and information sufficient to configure the second protocol for communication over the bus. That same setup message is configured to allow a device configured to operate only under the first protocol to configure itself in response to receiving the setup message. In one approach, the processing device for the module operating the second protocol can be configured to use a same software module to configure itself at set up time for both the first protocol and the second protocol. Virtually no changes have to be done in the software, and mixing new modules with legacy modules would not create any problem. Legacy modules would receive one instruction in each message (as today) but new ones would get everything in one message. As the contents are defined by the CAN id 0 and the first two bytes, the decoding would be the same in both instances.

Additional efficiencies can be realized in this manner where the processing device is configured to implement the second protocol by sharing at least one of the group consisting of: an error state message portion, an initialization message portion, an acknowledgment message portion, a sampling portion, and any combinations thereof with the message packet sent according to the first protocol. Where both the first protocol and second protocol utilize CAN based approaches, the processing device implementing the second module can be configured to implement the second protocol by sharing at least one of the group consisting of: a start of frame bit, an arbitration field, an error state bit, an acknowledgment bit, an end of frame bit, and any combinations thereof with the message packet sent according to the CAN protocol. Although the acknowledge bit is transmitted by all modules, the second protocol may or may not use this message to configure a module for further communication with an acknowledging module.

Additional modifications to the bit coding of an embedded protocol can be employed where the bit stuffing arrangement of the CAN protocol is omitted. Bit stuffing is not needed for the second protocol described above because the longest time between resynchronization edges is five consecutive dominant CAN bits. A CRC sum is calculated after each CAN byte and placed in the next two CAN bits. If a CRC mismatch is detected a CAN error frame is transmitted. In other approaches, if the first protocol needs resynchronization every 10 bits, then the second protocol will need resynchronization after a time equal to 10 second protocol bits. If a resynchronization occurs in every synch segment, it will be possible to have up to 10 bits in the propagation segment without resynchronization, which will demand that every first protocol bit is sampled recessive to secure that there are a recessive to dominant edge in every synch segment. If the number of second protocol bits are more than this, a resynchronization will be needed, and one example way is to include a stuff-bit every five bits or by fixing a rule that every sixth bit is a stuff bit with a polarity inverted to the value of previous bit. Here one can assume that the clocks have a tolerance better than 500 ppm as described by the J1939 standard. This will make it possible to keep the sampling of the secondary protocol bits over two first protocol bits. If the clocks are not good, one can implement a mechanism that will ensure a resynchronization in the synch segment to define the start of the secondary protocol sequence. One such rule is that if there is a dominant first protocol bit, there will be a recessive-dominant pair as a start condition, and if there is a recessive first protocol bit, there will be a dominant-recessive pair as a start condition ahead of the secondary protocol bits in the propagation segment. This approach will get all receiver modules in synch to sample the secondary protocol bits. To keep the synchronization additional stuff-bits may be needed, and the distance between the stuff-bits will set the maximum tolerance of the oscillator in the modules used in the system.

The above teachings are scalable where one module can be configured to communicate over the control network using a third protocol by communicating, during transmission of a message packet over the control network according to the first protocol, a third message embedded within the message packet using a third protocol. In another approach, different modules can embed different protocols. These embedded protocols do not have to follow any design rules of CAN. The voltage level in the example above is the same as for CAN, but it could have been different. Thus, a multitude of protocols, optimized for different purposes, can be embedded. Different groups of nodes in a CAN network may use different embedded protocols. For instance, the processing device for a module can be configured to change an encoding method for the second protocol in response to a change in operation mode for the communication device apparatus with such modes including, for example, a maintenance mode, a re-flashing mode, a run mode, a sleep mode, and the like. The bit rate for the second protocol could be modified as well.

Moreover, the processing device can be configured to apply the second protocol to fewer than every first protocol message sent from the communication device apparatus. For example, in many systems, the CAN bandwidth is quite sufficient for the most part of time during runtime conditions. In such applications, the embedded protocol will be used only for some specific messages that may require multiple transmissions over the first protocol, one example being GPS coordinates. The embedded protocol may also be used for diagnostics. Now On Board Diagnostics (OBD) is a legislated part of CAN communication in vehicles, requiring some message exchange during runtime conditions. This creates a bandwidth and as well a timing problem as OBD messages only appears when diagnostic checks are performed. Where a communication module is configured to operate in a vehicle bus, its processing device can thus be configured to effect transmission of vehicle on board diagnostics information using the second protocol during runtime sending of messages using the first protocol. Such application of an embedded protocol as described herein would eliminate the problem as OBD information could be carried by the embedded protocol and would neither affect timing nor bandwidth during runtime conditions. Another example is where a vehicle system is re-flashed. In this example, the processing device of the module is configured to control participation in a flashing operation of devices on the bus using the second protocol to reduce system delays during the flashing operation.

Still another benefit to the described approach is using the second protocol to help identify network problems. For instance, disturbances on the bus comprise a common CAN problem that can often be hard to find and cure. Such disturbances include wave reflections due to impedance shifts along the bus, clock frequency changes due to temperature variations across different nodes, and temporary distortions due external sources. Often, the disturbance at only one node in a system can alone destroy a CAN message. The margin to failure is typically not known. Thus, the second protocol can be used to address such issues. For example, the second protocol's high speed sampling capability can be used to detect noise in the first protocol messages. Noise in the propagation segment in the first protocol messages can indicate difficulty in utilizing the secondary protocol because the noise may cause bit errors or CRC-errors in the secondary protocol.

As said above, the embedded high speed protocol is typically only occasionally needed. When not used to communicate using the embedded protocol, the equipment can be used for an almost continuous quality check of the physical layer. In this approach, the processing device for a module is configured to use the second protocol to test signal quality for the control network. By one approach, the processing device is configured to control the second protocol to use a bit rate higher than the first protocol's bit rate and to determine whether second protocol bits embedded in a received first protocol message vary from an expected signal level as compared to a signal level expected for a corresponding portion of the received first protocol message when the received first protocol message does not have a message embedded using the second protocol. In other words, each module is set to listen to the bus, and during an idle bus, no zeroes should be detected. When a CAN message is transmitted, all bits in the bytes in the embedded protocol should have the same value as the CAN bit.

To illustrate this point, FIG. 8 shows the beginning of a received CAN message 600 sent from another module starting at recessive level 601 and a falling edge 602, indicating SOF. The falling edge is followed by three reflections 603, 604, 605. The two first ones are decoded as 11 indicating that the two first time quanta after a falling edge is not safe for the embedded protocol. FIG. 9 shows the same message at another module further from the reflection spot. Here the reflections are damped to a safe level for the embedded protocol. Another disturbance 605 is detected that easily could be seen as a false resynchronization edge or, if appearing at a sampling point, cause a bit error. Modules supporting, but not using, the embedded protocol could detect and log such disturbances that could make CAN modules resynchronize on false edges and/or sample wrong bit values. The disturbances would be very accurately time tagged according to the local clock at the respective module. Then, the processing device can effect sending information regarding determining whether the second protocol bits embedded in the received first protocol message varied from the expected signal level to a comparator device that is configured to compare the information to corresponding information from other devices on the control network to locate a source of control network error. This can be implemented by using the time recorded according the respective local clock and transposed to a common time, examples of which are described in U.S. Pat. No. 8,065,052, the contents of which are incorporated by reference herein. Disturbances caused by an impedance change on the bus can be distinguished from other types of disturbances and, as the wave propagation speed in the bus is known, it is also possible to determine the position of the impedance disorder in the bus by correlating the time stamps of the disturbance at the respective node and the bus length between respective node.

If it is determined that for a given control network that disturbances occur primarily in particular portions of a first protocol message, such as close to edges in the example above, the embedded protocol can be modified to refraining from using particular portions of the first protocol for embedding. In the above example, the second protocol could be configured to avoid using one or more of the first time quanta in the Prop_Seg for embedding data. The higher layer protocol CanKingdom demonstrates how the CAN bit timing can be optimized by using Kings Page 8, which same method could be used to specify the time quanta that should be used by the embedded protocol. In another such approach, the whole embedded protocol could be set up in a system specific way by applying the CanKingdom method, still using general modules.

In a further quality check, the clock for counting on the second protocol could be used to detect differences between a local clock and that of another device on the control network. In such an approach, the module typically uses separate counters for decoding the first protocol, such as a CAN protocol, and the embedded second control. Here, the processing device is configured to operate in a mode where no embedded second message is expected and when operating in the mode, to not resynchronize a counter for the second protocol in response to receiving a synchronizing portion of a received first protocol message. Then the processing device counts clock ticks of the counter for the second protocol over a portion of the received first protocol message to determine a clock rate for a module that transmitted the received first protocol message. Thus, in parallel to participating in the CAN communication, a node could easily determine the difference between the local clock frequency and the clock frequency of the respective transmitter by refraining to resynchronize the clock of the embedded protocol by comparing the time from the end of the arbitration field until the falling edge of the ACK bit as registered by the resynchronized CAN clock and the un-resynchronized clock of the embedded protocol. Additional advantages can be achieved by combining the current teachings with techniques described according to the U.S. Pat. Nos. 7,934,039 and 7,478,234, each of which are incorporated by reference herein in their entireties.

A further example implementation of a second protocol inside a first protocol will be described with reference to FIGS. 10-13. In this example, a CAN bus 701 has an electronic control unit (ECU) 702 connected at the bus's 701 far left end and a second ECU 703 connected at the bus's 701 far right end. In between these ECUs 702 and 703, more ECUs 704, 705, 70n are connected to the bus 701. The second ECU 703 transmits a message 1100 according to the CAN protocol, a part of which is illustrated in FIG. 11. A bit sequence 1 1 0 1 1 for the message 1100 according to the CAN specification is illustrated. More specifically, the Sync_Seg 705 and the Phase_Seg 1 and 2 706 of the 0 bit of the CAN message 1100 are illustrated. Next, the Sync_Seg 707 and the Phase_Seg 1 and 2 708 of the second 1 bit of the CAN message 1100 are illustrated.

Where the second ECU 703 is configured to operate according the second protocol as described herein, the ECU 703 will signalize the same bit sequence as illustrated in the message 1120. Here, the Sync_Seg 710 is understood as a one dominant bit quantum. The next part is recessive until the dominant Pase_Seg 1 and 2 711 followed by the dominant Sync_Seg 712 and the recessive Phase_Seg 1 and 2 713 of the first 1 bit following the zero bit in the original CAN message 1100. The second 1 bit after the zero bit is initiated by the dominant Sync_Seg 714. Under the original CAN protocol, a Prop_Seg is calculated to determine the signal delay between the ECUs 702 and 703, which is specified to be eight bit quanta, shown as 715. An additional nine bit quanta 716 are added to the left of the bit. The second protocol in this example is defined as one byte represented as one Start of Byte bit quantum followed by eight bit quanta.

The ECU 702 is instructed to use specific bits in a specific CAN message for transmitting bytes according to the second protocol. In this example, the segment 716 shows where in the original CAN protocol message 110 these bits are transmitted from the ECU 703. To illustrate the time delay on the bus and how the modules send information despite the time delay, FIGS. 12 and 13 illustrate what is sent 1200, 1300 by the first ECU 702 and what is received and transmitted 1220, 1320 by the second ECU 703. FIG. 12 is arranged according time perceived by the second ECU 703 whereas FIG. 13 is arranged according to time perceived by the first ECU 702. The transmission 717 from the first ECU 702 starts with the Sync_Seg 710. It propagates along the CAN bus 701 and reaches the second ECU 703. When it is detected by the ECU 702, the ECU 702 transmits the Start of Byte 718 followed by the bits 01101011 according to the second protocol. This is illustrated in FIG. 12 where the bits 01101011 are transmitted immediately in response to receiving the Sync_Seg 710 from the first ECU 702. The second ECU 703 then transmits a second byte 01010101 according to the second protocol in response to receiving the Sync_Seg 712 from the first ECU 702. This second protocol signal from the second ECU 703 propagates back to the first ECU 702, but due to the propagation delay, it is now positioned in the second part 715 of the original CAN signal being transmitted by the first ECU 702. The time difference 720 between 710 and 718, i.e., the propagation delay between the ECUs 702 and 703, is then readily measured by the first ECU 702.

So configured, not only can signals according to a second protocol from different ECUs be embedded in one and the same message according to a first protocol, but also the propagation delay between ECUs can easily be measured. A great variety of protocols with different qualities can be created by combining these teachings with those of certain prior teachings such as those described by U.S. Pat. No. 7,711,880 titled Schematizing Of Messages In Distributed Control And Supervision, U.S. Pat. No. 7,472,216 titled Variable Oscillator For Generating Different Frequencies In A Controller Area Network (CAN), U.S. Pat. No. 7,899,936 titled Device In A Modularized System For Effecting Time-Stamping Of Events/Reference Events, and U.S. Pat. No. 7,478,234 titled Distributed Control And Monitoring System, to name but a few, each of which is incorporated by reference herein in their entireties.

Figure 14:
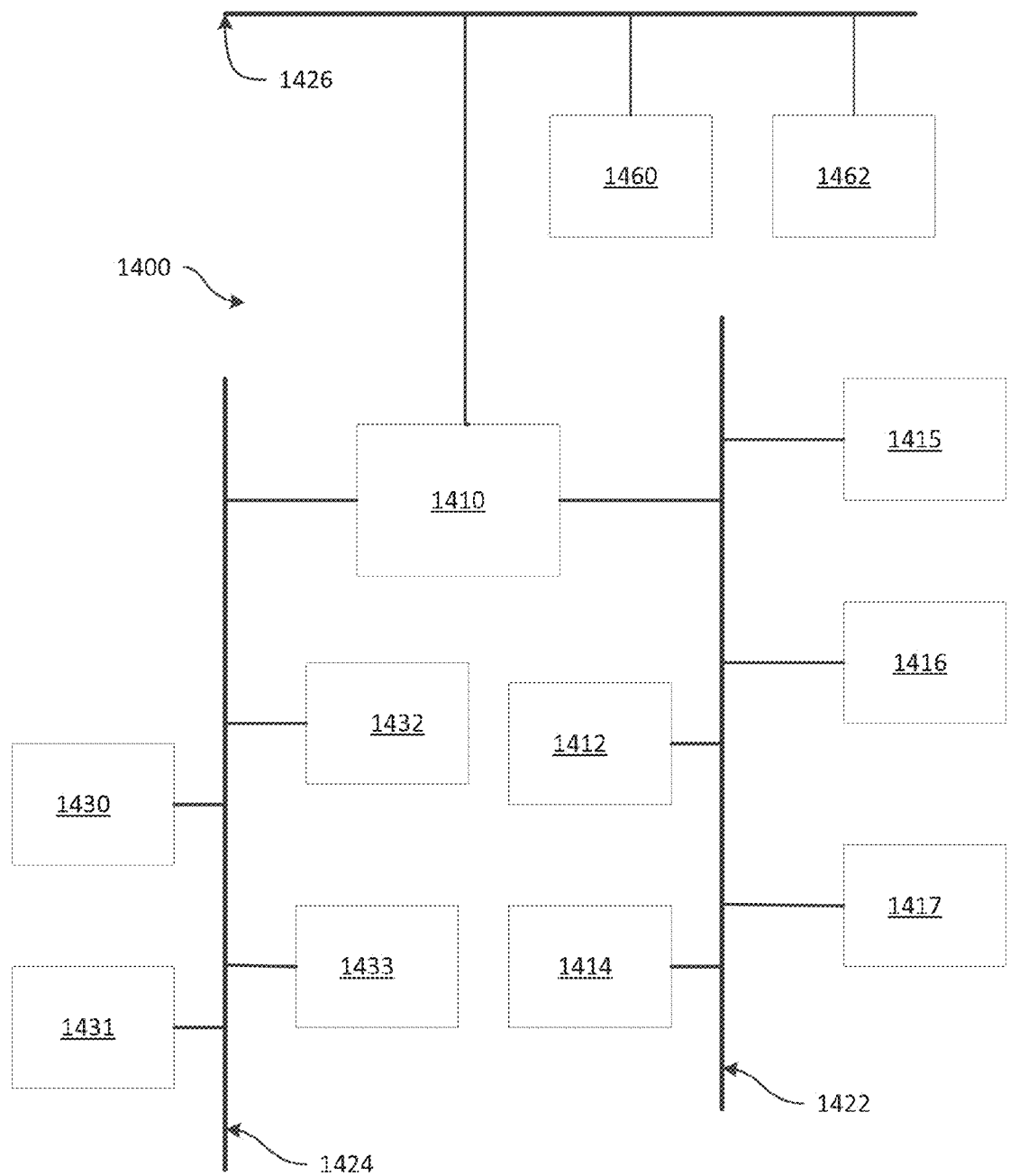
FIG. 14 comprises a block diagram of an example control network having a star topology as configured in accordance with various embodiments of the invention.

The various protocols described herein may also be applied in different control network topologies. In one example illustrated in FIG. 14, a CAN-based control network 1400 has a star topology with an active hub device 1410 in the center. The active hub device 1410 is configured to connect to a plurality of CAN channels 1422, 1424, and 1426 of the control network 1400 and act as a gateway among two or more of the plurality of CAN channels 1422, 1424, and 1426. For example, the active hub device 1410 can be an ECU connected to communicate on each of the multiple CAN channels 1422, 1424, and 1426. In another example, the active hub device 1410 could be three separate controllers only linked by software mapping messages or information between the three different buses. In still another example, the active hub device 1410 could also be a combined logic designed to transfer messages between the different buses more or less in real time.

In an example implementation of such a star topology network having a plurality of modules, a first set of the plurality of modules 1412, 1414, 1415, 1416, 1417 is configured to communicate using both a first and second protocol as described herein and is connected to communicate on a first CAN channel 1422 of the plurality of CAN channels. A second set of the plurality of modules 1430, 1431, 1432, 1433 are connected to communicate over the control network 1400 using the first protocol and not the second protocol over a second CAN channel 1424. A third set of the plurality of modules 1460, 1462 are connected to communicate over a third CAN channel 1426 of the plurality of CAN channels using both the first protocol and a third protocol by sending a message packet using the first protocol with a third protocol based message embedded within the message packet using the third protocol. The third protocol may or may not be compatible with the second protocol. Here, the active hub device 1410 is configured to receive messages using the second protocol via the first CAN channel 1422 and to send the messages using the third protocol via the third CAN channel 1426.

In another example of having multiple modules communicating in a given context, multiple modules configured to use an embedded protocol can be configured to receive a signal that a forthcoming first protocol message will be sent and configured to allow multiple second protocol messages to be embedded during the time of transmission of the forthcoming message. In response, the multiple modules can configure themselves such that individual ones of the modules send second protocol messages during certain portions of the forthcoming first protocol message. From a single module's point of view, the first module is configured to receive a signal that a forthcoming first protocol message will be sent and to configure itself to send a message based on the second protocol during a first defined portion of the forthcoming first protocol message less than a whole of the forthcoming first protocol message and to receive a second protocol message from another module during a second defined portion of the forthcoming first protocol message different from the first defined portion. Accordingly, multiple second protocol based modules can send information during the course of a single first protocol message, which can greatly reduce communication latency when multiple modules need to exchange information.

In one specific example of such an approach, one "master node" transmits a CAN based message with a given CAN ID and DLC, such as, for example, 1000 bits. The data field is then patterned with 1's. On the bus there will then be a pattern of ten blocks containing five recessive bits and one dominant bit. Each of the ten recessive bits can be used for the embedded protocol in different ways. One example could be to have an embedded protocol as suggested above, where each CAN bit can carry a byte according to the embedded protocol. The decoding rules for the information in the embedded protocol is given by the CAN ID in principally the same way as CAN higher layer protocols. The data bits are then scheduled, such that the first two five-bit sequences are reserved for a second protocol transmission from a first node, the second two five-bit sequences are reserved for a second protocol transmission from a second node, the third two five-bit sequences are reserved for a second protocol transmission from a third node, and so forth. Each module can then send eight bytes of data and a 15 bit CRC sum as in an ordinary CAN message. In this way, the latencies of transmissions from these second protocol nodes can be considerably reduced. For instance, transmissions from five nodes can be reduced five times, and the latencies between the data packages among these five nodes are known a priori to a high accuracy in this example. Different schemes can be applied according to different needs. Not only the data field can be used but also recessive bits in the CRC field, the CRC delimiter and the recessive bits after the ACK bit.

In an additional alternative embodiment, the functionality or logic described in herein may be embodied in the form of code that may be executed in a separate processor circuit. If embodied in software, each block of functionality or logic may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code. If embodied in hardware, each block may represent a circuit or a number of interconnected circuits to implement the specified logical function(s). Accordingly, a computer readable medium (being non-transitory or tangible) may store such instructions that are configured to cause a processing device to perform operations as described herein. One skilled in the art will understand the hardware approach to include field programmable gate arrays (FPGA), microcontrollers, and the like.

Generally speaking, electronics today are very complex and dynamic where there is a very unclear line between what is software and hardware. For instance, software will demand some kind of supporting hardware for storage of information, and basically every software instruction will rely on some hardware in the MCU core that will return the expected result from the instruction. It is also possible to claim the opposite because the design of hardware relies on some software and documents to describe the hardware to be produced. It is also possible to have hardware fixed from the drawing that will not be possible to modify without great difficulties to hardware gate array devices where the basic hardware is fixed but it will be possible to modify the final hardware function by using different connections of the internally basic structure. The most flexible solution available today is the above mentioned FPGA, which devices do not need to be finalized before delivery. Instead is it possible to make the internal connection between the basic structures when mounted in the product. The connections in the FPGA are done by setting a programmable value to certain value, in binary system it will be set to 0 or 1. The most common solution is to use a RAM technology to store the connection pattern. The drawback with such solution is that the device will lose the connection when power is lost, and it will be necessary to reconfigure the device every time the unit receive power. The advantage with configuration in SRAM is that it will be possible reprogram the device any time. Some newer devices even provide the possibilities to reprogram only a portion of the device. Some devices use flash memory to configure the connections in the FPGA. The advantage with this is the possibility to have a working device as soon as the power is stable. The drawback is that in most cases will it take longer time to program a flash memory as compared to a RAM. Some older devices do use a fuse technology to program the FPGA. The drawback with such solution is that when you have programmed the device in the unit once it is impossible to change the connections in the future. This is not 100% true because in most cases the connections at the start have the binary value 1 or 0 and you can change them from the default value, but you cannot switch them back again.

Various ways of implementing the second protocol inside a CAN protocol using hardware and software components are possible. In one approach, sending and reception of data comprise two independent processes with two different local clocks with the exception of arbitration, which is a mixture of sending and receiving at the same time. The sender places one bit at a time into the communication wire. The length of every bit is defined as a number of local clock cycles. In most cases, every bit sent has the same length in local clock cycles, but the protocol can accommodate a mixture of different bits with different length in the local clock cycles. In one example, a second protocol may use two different bit-lengths, but additional bit-lengths are possible. Each bit sent will generally have at least one out of two different levels, but more levels are possible. The level of each bit is defined by the protocol. Some fixed and other bits will depend on the data content, for example a digital 1 could be sent as one bit 0 and a second bit 1 compared to a digital 0 be sent as one bit 1 and a second bit 0, which such pattern is called Manchester coding. The sender will send a stream of bits starting with the first bit and ending with the last bit included in the protocol forming the message. The time between messages is called idle bus and could be a fixed level or a pattern of different levels indicating an idle communication bus.

In this example, the receiver generally stays idle while decoding the idle pattern on the communication wire. The start of a message will be a pattern different from the idle pattern, and this pattern includes an edge (a switch from one level to another level). The protocol defines how this edge is related to the location of the sampling point in every bit that follows in units of local clock units. If the receiver clock has the same pace as the sender clock, the receiver will sample every bit correctly through the message. Practically speaking it is difficult to impossible to have two clocks that will have the same pace through infinite time. Accordingly, a system either uses a clock that is good enough to keep the sampling point within the message, or the messages are designed to be short enough to secure that the clock will not deviate too much over the message. Neither solution is ideal because often available clocks are not accurate enough or the messages can become too short. To solve this problem the protocol can define certain edges used to adjust the sample point. Normally the edges are defined as the level shift between two bits. If those well-defined edges occur too early or too late, the receiver may be able to adjust the location of the sampling point relative to those edges to get the sampling better located in the following bits until there is a new edge that can be used for the next correction. During arbitration, a module should adjust the sending of bits according to reception of the edges as defined by the protocol. The precision of the clocks is given by how much the sampling point can change in time and still sample within the correct bit in combination with how often and how much the sampling point will be corrected by the protocol rules.

Figure 15:
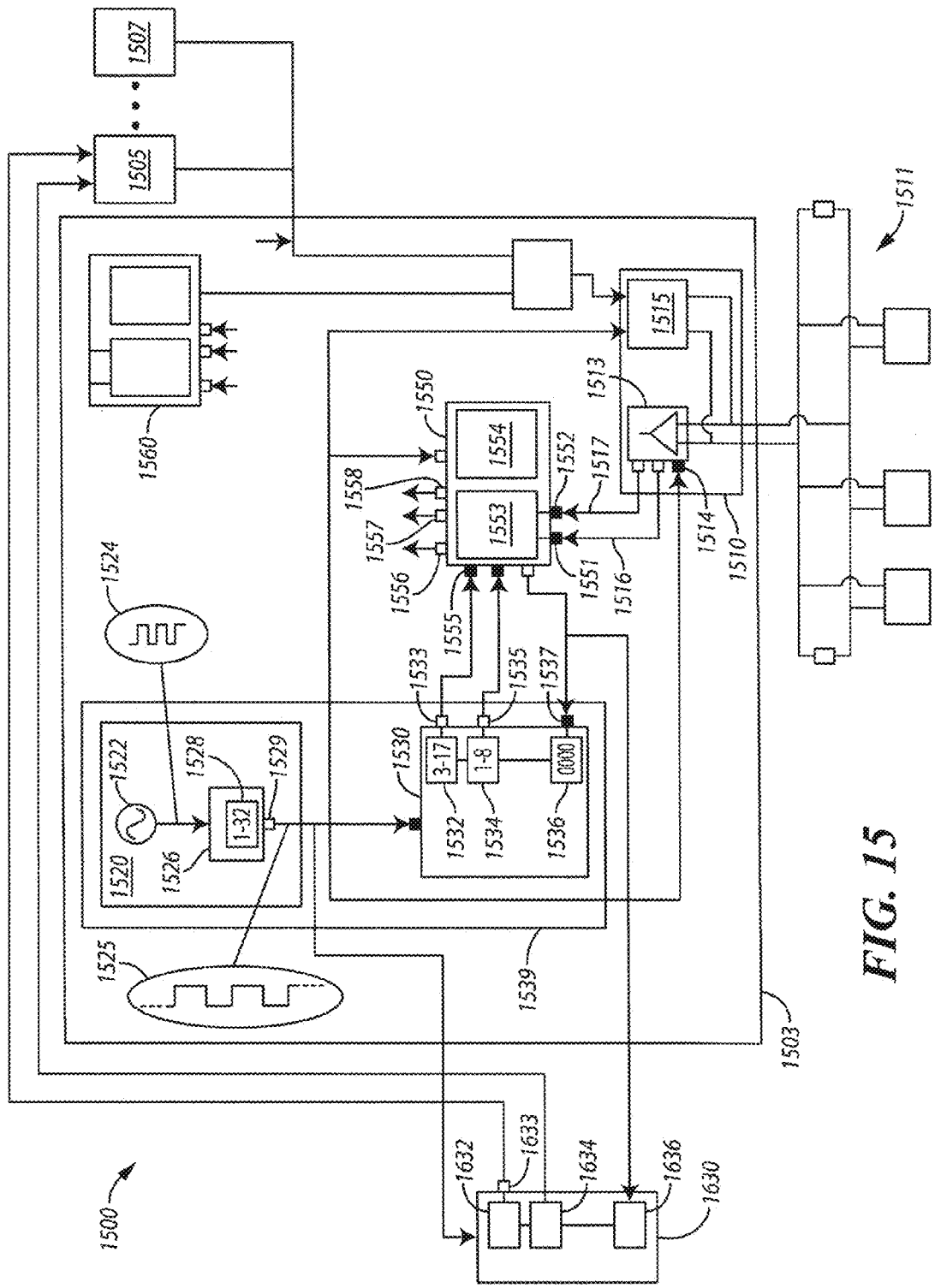
FIG. 15 comprises a block diagram of an example communication device as configured in accordance with various embodiments of the invention.

Turning to FIG. 15, a specific implementation of using a second protocol inside a CAN protocol will be described. Unlike specific implementations described above where a single processing device would prepare and send (and receive) both the first protocol and second protocol messages in a combined CAN/second protocol messages, two or more processing devices can act in parallel to handle different portions of the combined message. This aspect can be scalable where different processing devices are tasked with handling specific bit quanta or portions of a given sent or received message.

More specifically, in the example of FIG. 15, a communication device apparatus 1500 includes a communication port 1510 configured to connect to a control network 1511. A processing device for the communication device apparatus includes a first processing device 1500 configured to control the communication device apparatus for CAN communication arbitration and to control communication of the CAN message packet. The processing device also includes at least a second processing device 1505 and 1507 configured to control communication of at least a portion of the additional information over at least one of the bit quanta other than the defined bit quanta. In the illustrated example, the at least a second processing device includes separate processing devices 1505 and 1507, each configured to control communication of at least a portion of the additional information over a different one of the bit quanta other than the defined bit quanta. More or fewer processing devices can be so added, and different processing devices can have differing amounts or specific bit quanta assigned for analysis or generation.

In such an approach, the communication port 1510 is operatively connected to the first processing device 1500 to send the CAN message packet over the control network 1511 and the at least a second processing device 1505 to send the additional information over the control network 1511. Moreover, the communication port 1510 is configured to connect to the control network 1511 to receive CAN message packets transmitted over the control network 1511 and operatively connected to provide the received CAN message packet to the first processing device 1503 to read CAN message data and to provide the received CAN message packets to the at least a second processing device 1505, 1507 to read additional information in the CAN message packet. In the illustrated example, the communication port 1510 includes separate receiving (bus level indicator) 1513 and transmitting 1515 portions, although other configurations that substantially combine these aspects together are possible.

FIG. 15 further illustrates one example approach toward implementing a more precise clocking of the device to effect the ability to read and second data embedded within individual bits of a standard CAN message. In this example, a time event generator 1520 is operatively connected to at least two registers 1532 and 1632. The time event generator 1520 generates time ticks at a specific rate. The registers 1532 and 1632 are part of separate time counters 1530 and 1630. A first register 1532 of the at least two registers counts ticks received from the time event generator 1520 and in response to counting a first number of ticks to output a first trigger signal at output 1533 and resets. A second register 1632 of the at least two registers counts ticks received from the time event generator and in response to counting a second number of ticks to output a second trigger signal at an output 1633 and resets.

The first register 1532 provides the first trigger signal to the first processing device 1503 where the first trigger signal corresponds to a sampling time for the CAN message packet. The second register 1632 provides the second trigger signal to at least one of the at least second processing device 1505 where the second trigger signal corresponds to a sampling time for the additional information sent within the CAN message packet. In this manner, the registers 1532 and 1632 help the processing device track when to sense for voltage signals in a received packet or when to provide a signal in a sent packet. Sometimes these registers need to be reset to effect a resynchronization of the communication device apparatus with other communication modules on the control network 1511. In one approach, a reset device 1536 senses a start of frame and is connected to reset the at least two registers 1532 and 1534 in response to sensing the start of frame. In the illustrated approach, the reset device 1536, 1636 of each of the respective time counters 1530 and 1630 receives an output signal provided from the CAN bit recognizer module 1550 in response to sensing a start of frame signal on the control network 1511. Although the different registers used to provide time events for different sampling rates are illustrated in different modules 1530 and 1630, the registers need not be so separated in a given implementation.

One can understand the above example in the context of the concept of time. Most common communication protocols are based on the physical second for representing a bit. For example, the standard CAN protocol defines its bit time as "Bus management functions executed within the bit time frame, such as CAN node synchronization behaviour, network transmission delay compensation, and sample point positioning, shall be as given by the programmable bit timing logic of the CAN protocol IC. a) Nominal bit rate (BR) gives the number of bits per second transmitted in the absence of resynchronization by an ideal transmitter. b) Nominal bit time, $t_B=1/BR$."

On the other hand, time may be described as counting of bit quanta generated by an oscillator. For example, the standard CAN protocol defines the "programming of bit time" as "Programming of bit time shall be performed using the following periods of time . . . a) Time quantum The time quantum shall be a fixed unit of time derived from the oscillator period."

Time as such is usually not defined in communication protocols although some communication protocols are defined as event-triggered or time-triggered. This disclosure can be understood in view of three different concepts of time. First is NTime (Natural Time), which is the time concept everyone experiences every day but no one knows what it is. By NTime, one can record and organize events in a dimension with past and future, and one can distinguish between predictable and unpredictable events. NTime in normal conditions has no starting point and is continuous, irreversible, unstoppable, and endless.

Second is PTime (Physical Time), which is a scientific concept of time in laws of physics for describing NTime when modeling nature. PTime is continuous and reversible, i.e., any model based on laws of physics can be run reversibly in time. A model will then show the conditions at any point from start and finish and vice versa according to the model. The PTime has a base unit, the second (s), which is one of the seven base units in the International System of Units (SI).

Third is LTime (Local Time or Logic Time), which is generated by a time-tick generator and measured by a time counter. A combination of the two constitutes an LTime Clock (LTC). A LTC is the time source of a LTime Domain (LTD). Two or more LTDs can be correlated to each other and/or synchronized to one of them or alternatively to a virtual LTD. The main purpose of this concept of time is to coordinate a flow of events, states, and transition of states among themselves as well as with both PTime and NTime domains.

Some LTime features include being finite with a defined start and finish. LTime is stoppable and can be restarted. LTime can also be related to PTime and NTime in a non/linear way. Accordingly, time-tick generators can be independent of PTime and NTime.

A LTD is typically defined by one LTC where the respective LTCs of several LTDs may have the same Time-tick Generator. Multiple LTDs can be synchronized by Reference Events (RE).

Referring again to the example of FIG. 15, the time event generator 1520 includes an oscillator 1522 that outputs a time events 1524 to a TC 1526. The CAN standard defines a "time quantum" as follows: "The time quantum shall be a fixed unit of time derived from the oscillator period. There shall exist a programmable prescaler, with integral values, ranging at least from one (1) to thirty-two (32). Starting with the minimum time quantum, the time quantum shall have a length of: Time quantum=m*minimum time quantum, where m is the value of the prescaler."

To define the time quanta, the TC 1526 includes a register 1528 that sets the limit for the LTime. Each time the register 1528 reaches its defined limit, it transmits a Time Quantum Event at its output 1529 and resets itself. The result is a stream of time-tick events, i.e., a stream of Time quanta 1525. The time event generator 1520 defines a LTD, programmable to span from 1 to 32 time events that can generate time quanta according to the CAN protocol. The LTC or time event generator 1520 is acting as a time-tick generator and feeding the time counter 1530 with time events. The time event generator 1520 and time counter 1530 form another local time counter 1539.

The time counter 1530 includes an event input 1537 that resets the counter 1530 in response to receiving an event. The first register 1532 in this example is programmable from 2 to 17 and transmits an event at the output 1533 when the first register 1532 reaches the programmed value. The second register 1534 is programmable from 1 to 8 and transmits an event at the output 1535 and resets the counter 1530 when the counter 1530 reaches the programmed value of the first register 1532 plus the programmed value of the second register 1534. According to the CAN specification, a CAN bit consists as a minimum of a Sync_Seg time quantum, one Prop_Seg time quantum, one Phase_Seg 1 time quantum, and one Phase_Seg 2 time quantum, i.e., four time quanta, and the maximum length is Sync_Seg plus 24 time quanta. The first register 1532 can be programmed to cover Sync_Seg plus Prop_Seg plus Phase_Seg 1, and the second register 1534 can be programmed to cover Phase_Seg 2. The local time counter 1539 will the count the number of time events representing a CAN bit and generate an event after Phase_Seg 1 and another one after Phase_Seg 2.

Such a local time counter 1539 is capable of supporting a CAN bit recognizer 1550 as well as a bus level indicator 1513. In the illustrated example, the bus level indicator 1513 has an event input 1514 that receives time events 1525 from the time event generator 1520. In response to receiving a time event from the time event generator 1520, the bus level indicator 1513 samples the bus voltage on the CAN bus control network 1511. If a voltage is detected, the bus level indicator 1513 transmits a voltage-event signal 1516 to an event input port 1551 of the bit recognizer 1550. If no voltage is detected, the bus level indicator 1513 sends a no-voltage-event signal 1517 to an event input port 1552 at the CAN bit recognizer 114. In this arrangement, therefore, the CAN bit recognizer 1550 receives either a voltage signal or a no-voltage event signal at each time-tick event generated by the time event generator 1520.

The CAN bit recognizer 1550 includes an event logic device 1553 and an event counter 1554 that counts time events 1525. The event logic device 1553 is operatively coupled to an input port 1555 connected to receive first register events from the time counter's 1530 first register 1532. When operating under the CAN specification, a bit's value is decided at the end of the Phase_Seg 1, in which case the first register 1532 stores a value that generates a first register event corresponding to an expected Sample Point Event for a given CAN bit. The first register event triggers the CAN bit recognizer 1550 to detect a voltage on the control network 1511 at the expected Sample Point Event, in response to which the event logic device 1553 outputs a recessive bit event (corresponding to a logic "one") at output 1556 in response to determining a no-voltage event from the bus level detector 1513. If a voltage event is detected at the Sample Point, the event logic device 1553 outputs a dominant bit event (corresponding to a logic "zero") at output 1557 unless the dominant bit event is a Start Of Frame event. A Start Of Frame event occurs upon detecting a logic "zero" after detecting ten or more consecutive Recessive Bits (logic "one").

The event logic device 1553 is also triggered to detect a voltage in response to receiving a Start Of Frame register event signal from a Start Of Frame register 1534, which in this example is operatively connected to the first register 1532 and programmed to start counting time events in response to receiving an event from the first register 1532. After reaching the time event count programmed into the Start Of Frame register 1534, it outputs a Start Of Frame check event via an output 1535 to the event logic device 1553 to trigger the event logic device 1553 to check for a voltage corresponding to the start of frame for a bit following a sample point reading triggered by the first register 1532.

Generally speaking, the event logic detector 1553 is configured to recognize not only the recessive, dominant, and SOF bits by comparing voltage events, Sample Point events, and the number of time-tick events counted by the counter 1554. In response to detecting a Start of Frame event, the event logic detector 1553 generates a SOF Bit event signal at output 1558. These signals from outputs 1556, and 1557, and 1558 are received by a Protocol Logic Unit (PLU) 1560 that is configured to decode the bit stream received over the control network 1511 according to the CAN protocol.

Figure 16:
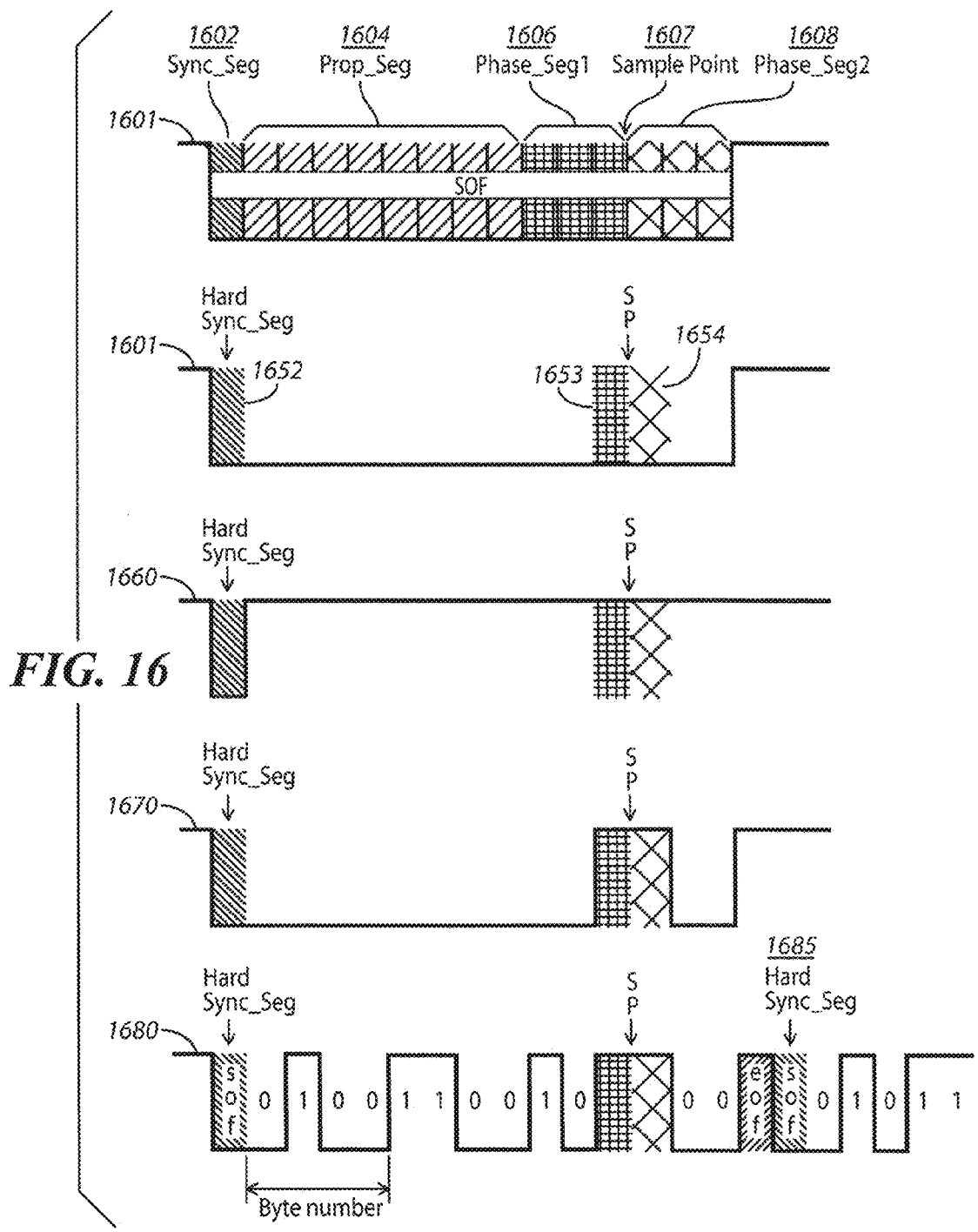
FIG. 16 comprises schematics of several example messages sent as configured in accordance with various embodiments of the invention.

The following describes one example way to program the example of FIG. 15 to sense a standard CAN bit such as that illustrated in FIG. 16. This data to be received is defined by a voltage level 1601 on the control network 1511. The standard CAN bit here has the following portions: the Sync_Seg 1602 is one time quantum, the Prop_Seg 1604 is eight time quanta, the Phase_Seg 1 1606 is three time quanta, and the Phase Seg_2 1608 is three time quanta, the prescaler is set to sixteen so that the oscillator generates sixteen minimum time quanta to build up a single bit. Accordingly, the register 1528 is set to sixteen. The first register 1532 is set to twelve, and the Start Of Frame register 1534 is set to three. With these settings, the CAN bit recognizer 114 can trigger a resynchronization in response to detecting a hard Sync_Seg by so notifying the reset devices 1536 and 1636. The local time counter 1539 defines the time quanta of the bit, and the first register counts to the twelfth bit quantum to trigger a sampling at the Sample Point, and the Start Of Frame register counts to the third bit quantum after the Sample Point to trigger a sampling of the Start Of Frame for an expected next bit. So triggered, the event logic detector 1553 pipes CAN bits detected on the control network 1511 to the CAN Protocol Unit 1560.

More specifically, when receiving the initial falling edge, the receiving device 1500 assumes it is a Start Of Frame (SOF) bit 1652 of a message and makes a Hard Sync, i.e., resets the counter of time quanta. In the example where a Hard Sync occurs in a bit after a start of a new message, the SOF 1652 can be referred to as a Start of Bit. After twelve time quanta, the Sample Point 1607 is reached, which lies between the last time quantum 1653 of the Phase_Seg 1 1606 and before the first time quantum 1654 of the Phase_Seg 2 1608. The voltage level is sampled at the Sample Point 1607 or SP. If the voltage level is dominant as illustrated with the voltage lines 1601, then the bit is decoded as a SOF where the falling edge at the time quantum 1652 is considered a start of a new CAN bit. If instead a recessive level is detected at the Sample Point as illustrated with the voltage lines 1660, 1670, and 1680, and the bit is ignored. For example, voltage line 1670 illustrates a voltage level that falls to a dominant level but raises to a recessive level after 11 time quanta and falls to a dominant level again after 12 time quanta and raises again to recessive level after 15 time quanta. Because the receiver sampled a recessive level at the Sample Point (SP), the bit is ignored as a SOF bit.

In other words, FIG. 16 illustrates another case where because a CAN receiver only samples twice within a standard CAN bit while ignoring any voltage level shifts in between, these ignored parts of the bit could be used for bit transmissions of another protocol at a higher bit rate. In one example, the second protocol can transmit bytes on an idle CAN bus as illustrated with the voltage line 1680. Here, the transmitting device uses the same time quanta as the CAN system but each time quantum represents a bit. A quantum sampled as recessive level is decoded as a 1, and a time quantum sampled as dominant level is decoded as 0. The protocol has the same definition of an idle bus as CAN but defines the Sync_Seg of a CAN SOF as a start of frame (sof). After a sof comes a first data frame of eleven bits followed by two recessive bits at the standard CAN sampling point. The two recessive bits are decoded by standard CAN modules as recessive and therefore triggering the standard CAN modules to ignore the initial falling edge at the sof. Accordingly, the standard CAN modules consider the control network bus as idle. A second data frame of two bits follows the two recessive bits followed by an end of frame (eof) bit at recessive level. The first four bits in the first data frame is a byte counter, i.e, fifteen consecutive bytes can be transmitted as a message. The voltage track 1680 then illustrates the voltage level shifts of a transmission according to the example second or embedded protocol. After the sof, the byte counter binary number 0100 (decimal four) is followed by binary number 11001000 binary (decimal 200). Immediately afterwards, the next sof 1685 indicates a start of a next sequence, which starts with a byte counter value of 0101 binary (decimal five).

In this way, the start of frame bit for a standard CAN communication can be used to force a resynchronization of modules between sequences of second or embedded higher frequency protocols to reduce transmission errors caused by poorly synchronized time event generators for various modules on the control network. Generally speaking, in a situation where a second message is embedded within a first protocol's message packet and a receiving device adjusts a position of the sample point within the received first protocol bit in response to sensing a transition edge within a defined portion of the received first protocol bit, a device can transmit a series of bits according to the first protocol having the transition edge to effect movement of the sample point for a receiving communication device to provide additional room within a first protocol bit in which to embed the second message using the second protocol. In such an approach where the CAN protocol is the first protocol, if the Sync_Seg following a recessive bit would be set to dominant level, the oscillator accuracy problem across modules would be reduced because all of the modules' clocks would be re-synchronized at every bit. The re-synchronization and Synchronization Jump Width (SJW) rules of CAN would not be needed. Modules on the control network configured to only understand the standard CAN message will sample within Phase_Seg 1 and Phase_Seg 2 thirteen bit quanta after last resynchronization. As the example new protocol generates a dominant Sync_Seg, such original CAN controllers will resynchronize at least every second recessive bit but only at the sixth bit after five consecutive dominant bits. Regardless, this resynchronization is twice as soon as the thirteen bit requirement, thereby keeping the various modules sufficiently synched.

Moreover, the original CAN modules can be tricked into moving their sampling points to allow for more room within a CAN bit to transmit second protocol information. For instance, a second protocol module's processing device can transmit the series of bits according to the first protocol having the transition edge by sending a series of recessive bits where a Sync_Seg bit quantum of a following bit is dominant to provide the transition edges to effect the movement of the sampling point. The second protocol module's processing device can also transmit the second message using the second protocol at least in part within bits transmitted using the CAN protocol in portions of the bits other than Sync_Seg bit quantum and the sample point such as using Prop-Seg portions of the CAN message packet. The transition edge need not have the full width of a Sync_Seg as defined within a CAN protocol; instead the edge can have the length sufficient for detection by the modules on the communication network.

To detect voltage levels at every time quantum, the second register 1630 can be programmed with particular counts to trigger either the event logic detector 1553 or a second processing device 1505 to sample voltages at bit quanta other than those defined for the typical CAN standard. In this way, bits can be sampled at different bit rates from decoding voltage levels on the bus according to the CAN specification in addition to other embedded protocols using the LTime Domain. The system does not require use of Physical time or Natural Time where the connection to NTime is through the oscillator 1522. The oscillator 1522 could be replaced by anything that generates a stream of events, such as a magnetic pickup sensing the tips of a turning cogwheel. Accordingly, a CAN network could be built where all ECUs are connected to the magnetic pickup, and CAN messages would be correctly encoded and decoded but the bit rate per second would vary with the rpm of the cogwheel.

If local oscillators are used as Time-tick Generators in a system, the frequency of the time quanta defined by the various time-tick generators 1520 at the respective ECUs within the system should be synchronized. This can be done in two ways, either by adjusting the frequency of a given oscillator or by adding or deleting Time-tick events to/from the time-tick generation stream 1525. Either approach can be effected though feedback between nodes over the control network 1511 and/or via control signals from a master node on the control network 1511.

Controlling the voltage level for every time quantum can provide further benefits beyond embedding a second protocol. For example, the CAN standard is often accused of being power hungry. A way to reduce the power would be to transmit a dominant level only during the Sync_Seg and Phase Seg 1 and 2, thus reducing the transmission power as compared to leaving the voltage level high.

If the second protocol is employed within a standard CAN message, certain advantages can be realized by indicating the new protocol though setting the RTR, r1, and r0 bits all to the recessive level. After the RTR bit. all CAN controllers are resynchronized to the transmitting node by sensing the falling edge from the recessive RTR bit whereby the embedded second protocol can embed data in the CAN message from there on. By one approach, the r1, r0, and DLC bits can be used to indicate how many second protocol bits will be embedded in each CAN bit. As the second protocol can have its own time quantum definition, it is possible to have a higher resolution, and thus more than one embedded bit in a CAN time quantum. In some approaches, only one extra bit is embedded in the standard CAN bits, which embedded extra bit is sampled between the Sync_Seg and Phase_Seg 1 time quanta to minimize influence by wave reflections on the physical bus that in some application can increase a data error rate.

Specific Considerations for Implementation in a Legacy CAN Communication System

In legacy CAN systems, resynchronization of modules occurs where a dominant signal in the Sync-Segment follows a recessive bit. This is the rule for all legacy CAN to better adjust the sampling point relative to this edge. In general, legacy CAN systems leave open a space around the sampling point to confirm receipt of the signal because errors in timing may result in receipt of the signal by some time before or after the sampling point. By effecting such a resynchronization a number of times, a module communicating using the second protocol described above will have confirmed the location of the legacy CAN sampling point to be much more accurate than the usual time allotted before and after the legacy CAN sampling point using SJW rules thereby securing additional space within a legacy CAN bit for second protocol communications. For example, if more edges effecting a resynchronization of legacy CAN system modules are produced, the sample point can be moved to the theoretically correct location in-between Phase-Segment1 and Phase-Segment2 allowing for almost all of the Phase-Segment 1 and Phase-Segment2 to be available for second protocol data. In short, all recessive bits followed by this dominant Sync-Seg will adjust the sampling point for the legacy CAN systems, and this feature can be used by a second communication protocol module to make additional room within a legacy CAN bit for second protocol communications.

In legacy CAN it is possible to have a sequence of ten bits without an edge, however, and if those bits are all recessive and the second protocol does not send a dominant signal to effect a resynchronization, the second protocol will be limited in the amount of the phase segment available for use in sending second protocol data because of uncertainty in the location of the actual legacy CAN sampling point. Instead, frequent adjustment of the sampling point confirms for the second protocol modules that the legacy CAN sampling point will use only a small portion of the phase-segments thereby making available more space in the phase segment before the location of the sampling point in which second protocol data may be sent. Placing second protocol bits after the legacy CAN modules have sampled recessive will cause edges to be used for resynchronization, which limits the ability to send second protocol data in the phase segment after the legacy CAN sampling point.

When the legacy CAN system samples a dominant signal, however, it will ignore any edge after the sample point such that the second protocol modules can insert additional data in the second phase segment after the legacy CAN sample point. Accordingly, a module can increase the amount of room in which second protocol data may be inserted into a legacy CAN bit by balancing the use of resynchronizations to confirm the legacy CAN sample point location versus use of dominant legacy CAN samples to allow insertion of second protocol bits after the legacy CAN sample point. For instance, in the first dominant legacy CAN bit after a series of resynchronization, 90% of the whole phase segment may be available for second protocol communications. In the second dominant legacy CAN bit, 80% of the whole phase segment may be available for second protocol communications as so on until the fifth consecutive dominant legacy CAN bit where 50% of the whole phase segment can be used in addition to all of the propagation segment. Again we have the limitation in legacy CAN that it is against the rules to have more than five consecutive bits with the same sample value. The sixth bit must be recessive, but in this bit it is possible to place high speed bits in all sync-segment and propagation-segment and 40% of phase segment1. After the sample point, then, the signal stays recessive and without any edge until the start of the dominant Sync-Segment following the recessive bit, which edge adjusts the sampling point back to the theoretically correct location. The above cycle then restarts where it is possible to put high-speed bits as soon as the edge is detected and up to 90% of the whole phase-segment. In practice, the Sync-Segment should be just as long as necessary for all modules on the bus to recognize the dominant edge following the recessive sample. If the dominant Sync-Segment is too short, some legacy CAN nodes may not recognize the signal to resynchronize. In this example implementation, the CRC-part of the message will vary with the different bits in the CAN-frame up to the start of the CRC.

In this implementation, the system should confirm correct sampling of the second protocol. In one example, if you need to adjust the sample point every ten bits in legacy CAN to keep in the sample location within the bit, the system may more or less do it equally often in the second protocol for the high speed bits. If the Phase segment is 20% of the legacy CAN bit, most of the bit is for propagation segment and it is only the phase segments that are needed to compensate for clock deviation. So if the if first protocol can handle clock deviation over ten bits with 20% of the bit, then the second protocol will handle 100 bits in a stream until a resynchronization is demanded in the example where the communication is unidirectional and the only compensation needed is the clock deviation between sender and the receiving nodes because high speed bits have no use of the propagation segment. Typically, it is the receiver with the least accurate clock that will set the performance of the physical layer. If the clock performance is even better it will be possible to have even more bits in a row before it is necessary to have an edge where it is possible to resynchronize to get the sample point better located in the bit. The other extreme would be to have a very small propagation segment (in the case where a communication bus, for example, has a short cable and very unstable clocks) where most of the Legacy CAN bit is used for phase segments. In this case it will be necessary to resynchronize almost every 10 bit in the secondary protocol.

There are no theoretical limits with respect to the relation between the legacy CAN (first protocol) bit-rate and the second protocol bit-rate because the only restriction is that the second protocol bits do not cause the Legacy CAN modules to sample second protocol bits or use the second protocol bits in such way that they will resynchronize the first protocol units in a wrong way. As an example, we have tested communications where the second protocol bit-rate was 80,000 times the first protocol bit-rate. In such case there will be about 40,000 second protocol bits in every first protocol bit (assuming that the propagation segment is about 50% of the first protocol bit). In such case, we resynchronize the second protocol at least 400 times if the clocks demand resynchronization every 100 bits.

At those extreme numbers a very precise location of the first bit is used in the second protocol. Even if you have a precise dominant edge in the sync-segment in a first protocol bit divided into ten time quanta, the second protocol bit will be out of sync already by 2.5% into the Sync-Segment quanta at the end of the sync-segment, and the second protocol receiver could be 40 bits out of phase with the sender. In those cases, the second protocol starts with an edge to secure that the following samplings in the second protocol sample in the correct location, and resynchronization in second protocol should occur every 100 second protocol bits as well as with a first protocol bit.

Implementation of an Additional Synchronization with CAN-FD

Although implementation of a second protocol within a first protocol is described above primarily in terms of adding bits inside of a legacy CAN bit, aspects of the second protocol described above may be implemented into or combined with other protocols such as the CAN-FD protocol as described in the paper CAN with Flexible Data-Rate Specification Version 1.0 (release Apr. 17, 2012), which paper is incorporated by reference in its entirety herein. The CAN-FD protocol defines a first part of a transmission that largely follows the rules of the legacy CAN protocol. After this initial transmission portion, a message sent according to CAN-FD can switch to a higher bit rate. CAN-FD uses an edge (Extended Data Length (EDL) bit) between the Identifier Extension Flag (IDE) bit and the r0 bit that defines the start of the CAN-FD higher speed portion, which edge is also used as the last synchronization before entering a high speed portion of the transmission. The start of the high speed transmission portion, however, is delayed until the switch in bit rate at the Bit Rate Switch (BRS) bit, which delay can result in variance of the receiver's clock with respect to a high speed portion sampling point. The lack of having a resynchronization built into the high speed portion of the CAN-FD protocol can result in a need for higher quality clocks and a limit in the ability to improve sampling speed at the high speed portion of the protocol, thereby limiting the overall possible bandwidth.

If the resynchronization approach described above with respect to the second protocol implementation in a legacy CAN system is applied to the high speed portion of CAN-FD, a CAN-FD approach could have a much higher bandwidth because of increased confidence in sampling at the higher speed sampling point. For instance, by defining an edge in the first bit of the high speed portion of the CAN-FD protocol (or just after the BRS bit) for resynchronization, the receiver will sample very correctly in the very first bit, and after some number of bits there will be edges in the bit-stream that can be used to resynchronize the sampling point to a proper location in the received bits. Thus, a sending module's processing device may send a dominant bit following a recessive signal to define an edge at a beginning of the second portion of the message such that the modified CAN-FD protocol is defined in part by a receiving device adjusting a position of a sample point for second high speed portion bits in response to sensing the edge. For example, in CAN-FD this new resynchronization edge can be located in the high speed portion of CAN-FD directly after the BRS bit is sampled or as the finish of the BRS bit/start the high speed portion, where in the slower portion of the protocol the next bit slower portion bit would have started. Delay in high speed implementation relative to synchronization is largely eliminated because the edge of the first detected high speed bit defines the start of the high speed portion of the CAN-FD message. The only drawback in this solution is that the first high speed portion bit is defined as dominant to have this bit define the start of the high speed portion. Tests confirm that it is at least possible to have a bit rate ratio of 1 legacy CAN bits to 80,000 CAN-FD bits if this synchronization technique is applied to the CAN-FD protocol.

A Specific Implementation and Optional Uses of CAN Embedded Format

A specific implementation of the second protocol above will be described as applied in a traditional or extended format CAN. Here, the second protocol is referred to as CAN-Embedded High Speed Format or CAN-EF. In this implementation, the strict requirements enforced on a CAN bus system provide a base for embedding a secondary data transfer mechanism in the CAN frame.

Generally speaking, and as illustrated in FIG. 17, a CAN frame (either CAN base frame 1710 or a CAN extended frame 1720) is divided into two bidirectional periods 1712, 1714 and 1722, 1724 respectively, meaning that more than one module is actively communicating and exchanging information. A unidirectional phase 1716 or 1726 is located in the middle or between the two bidirectional periods 1712, 1714 and 1722, 1724. In other words, at this point in the frame, only the transmitting module is active on the bus while the remaining communication modules are in a listen-only mode. The first bidirectional phase 1712, 1722 is the arbitration field that ends with the RTR bit as described above. The frame period from IDE in the CAN base format frame 1710 or from R1 in the CAN extended format frame 1720 until and including the CRC Delimiter is a time of unidirectional communication.

In the unidirectional communication, the propagation segment has no purpose when the receiver is perfectly synchronized to the transmitter. The embedded protocol uses this fact to send an alternative protocol in the propagation segment as described above. In a situation without arbitration, the full propagation segment can be used from the IDE/R1 bit.

Arbitration Offset and System Synchronization

Figure 19:
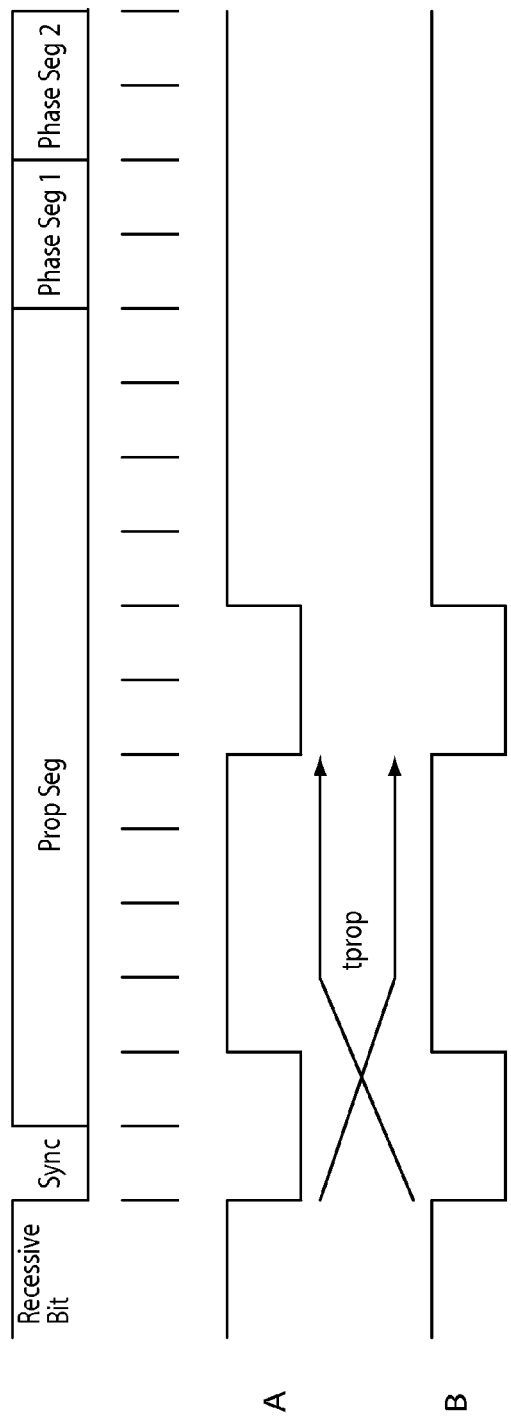
FIG. 19 comprises time lines of two CAN-EF modules A and B transmitting a synchronization pulse during a CAN transmission.

During arbitration the timing difference between any two nodes can be as large as one propagation delay when the two units are at the cable length limit. To illustrate the arbitration situation, FIG. 19 illustrates Unit A transmitting one propagation delay earlier than unit B. The worst case occurs when unit B wins the arbitration. The two units are in this case entering the unidirectional phase with the maximum offset, and the whole propagation segment is used for compensation. In a worst case scenario, the CAN frame data sequence could result in a minimum of synchronization information giving one dominant edge every ten bits, just compensating the allowable frequency offset. In this case, the size of the part of the frame that can be used for the second protocol embedded frame is limited by the propagation delay if arbitration occurs.

The synchronization offset created by the arbitration can be reduced by a factor of two if the units start transmission at the same absolute time. A synchronization pulse is a dominant pulse sent during bus idle periods that is short enough to not be detected as a start of frame. FIG. 19 shows two communication units configured to transmit according to a CAN-EF approach that are transmitting a synchronization pulse. Both units start at the same absolute time. The falling edge from units A or B will reach all units on the bus within one propagation delay. At the end of arbitration the maximum difference will be the sum of one propagation delay and the difference added by uncertainty in the clock of a given unit.

The synchronization pulse sent before start of transmission guarantees that all CAN units will be synchronized to the units A and B and that the arbitration starts with synchronized units.

To achieve synchronization a timing reference can be used. For example, one of the units (A or B) can be set to act as a timing reference and to transmit timing reference pulses. To achieve absolute time, the propagation delay from the reference unit to all other units must be estimated.

CAN Synchronization

Resynchronization in the receiver is done for every recessive to dominant edge as long as the relevant synchronization rules for CAN are followed: 1) only a single synchronization between two sample points is allowed, 2) only synchronization edges following a recessive sample bit are used, and 3) only recessive to dominant edges are used for synchronization. A node transmitting a dominant bit shall not synchronize to a recessive to dominant edge with a positive phase error. The other synchronization rules do not apply to the CAN unidirectional phase. These rules give the following conclusions: 1) no edge following a dominant sample will be considered a synchronization edge, and 2) only the first edge following a recessive sample will be used.

Satisfying CAN Synchronization

Figure 20:
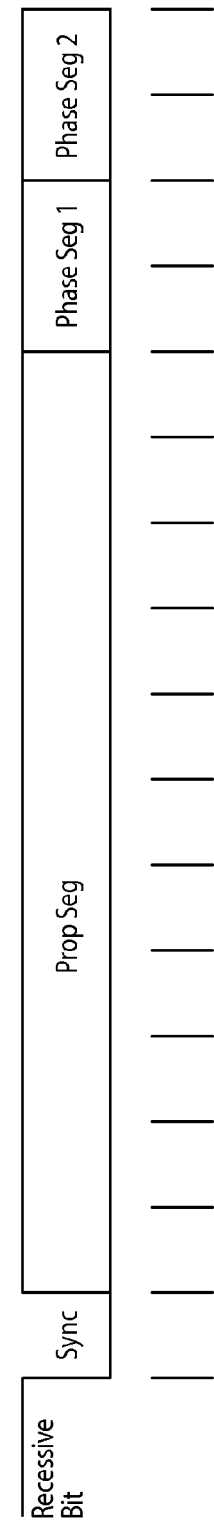
FIG. 20 illustrates a CAN transmission having a dominant sync segment following a recessive bit.

To be able to use the propagation segment for embedded data transfer the CAN receivers must be hindered from doing false synchronization in this region. If a dominant CAN bit is received, this condition follows automatically from the CAN synchronization rules. When a recessive bit is received, however, the receiver must be forced to synchronize in the synchronization segment to avoid losing synchronization to the transmitter. This behavior is handled by transmitting the synchronization segment dominant as illustrated in FIG. 20. This approach ensures a falling edge with correct CAN timing following every recessive bit. All edges until the next sample point should be ignored according to the CAN specification.

A side effect of this approach is that the CAN timing during the embedded frame is improved as the longest time between synchronization edges decreases from 10 to 6 bits, which in turn results in a sync jump width (SJW) requirement of 60% of the CAN requirement.

Example: Embedded Frame in Propagation Segment, No Arbitration

When the CAN synchronization as described immediately above is satisfied, the propagation segment 2102 can be used for embedded data as illustrated in FIG. 21. No edge created in this embedded frame should be able to alter the CAN frame synchronization.

The definition of phase segment 1 illustrated in FIG. 22 is changed in the unidirectional phase. The sampling at the receiving end is within the region SJW+SP (Sampling Point) before and SJW after the transition from phase segment 1 to phase segment 2. The Sampling Point SP field is the uncertainty added by the SYNC quanta. Depending on the shorter maximum synchronization delay, the SJW can be as low as 60% of the full CAN SJW. The resulting phase segment 1 requirement will then be $$t_{ps1} = 1 + 0.6 SJW$$

during the unidirectional phase (see FIG. 23).

The inequality below is used to calculate usable values for SJW so that the clock tolerance requirement is not determined by SJW, where PS is the phase segment length and BT is the bit time, usually expressed as a number of quanta.

$$SJW > \frac{20BT \cdot PS}{2(13BT - PS)}$$

The phase segment 2 is assumed to be equal to phase segment 1, and the processing delay is assumed to be smaller than or equal to PS1.

The required phase segment 1 during the embedded format part of the frame is then:

$$t_{ps1} = 1 + \frac{6BT \cdot PS}{13BT - PS}$$

The required phase segment length can also expressed in relation to a known clock tolerance, where df is the frequency offset for the clock:

$$SJW > 20BT \cdot df$$

$$t_{ps1} = 1 + 12BT \cdot df$$

The margin needed from the nominal sampling point approaches one time quanta as the clock tolerance improves.

Synchronization After Arbitration

The part of the frame that can be used for the embedded frame is severely limited by the propagation delay in the case of arbitration. Dominant edges that forces more synchronizations can be introduced to improve the time before synchronization is reached more. One method to achieve this would be to send alternating recessive/dominant bits to create a dominant edge every second bit.

Figure 24:
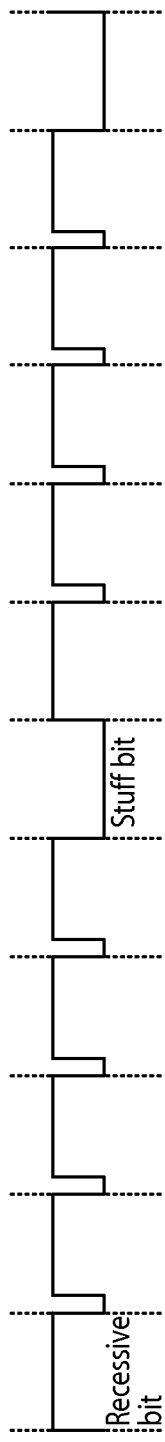
FIG. 24 illustrates transmission of a sequence of recessive bits where five out of six bits have a synchronization edge as configured in accordance with various embodiments of the invention.

Using the method described in the previous section, dominant edges can be created in recessive bit sequences. If instead a sequence of recessive bits is sent, five out of six bits will have a synchronization edge as illustrated in FIG. 24. Every synchronization edge will reduce the offset by SJW time quanta, but for every bit some time offset is added because of the frequency offset between units. The average improvement in number of time quanta for one bit is then at least:

$$\frac{5}{6} SJW - 2 \cdot df \cdot BT$$

The length of the embedded frame could then be increased at the rate of the dominant edges, and the maximum of the embedded data channel could be used.

Moreover, the performance of the synchronization before the embedded frame is improved with the application of larger SJW settings. If the maximum propagation delay in the system is known, the required number of dominant edges could be used as a configuration parameter to reduce the time before starting the embedded frame region.

If the clock tolerance is unknown, the worst case can be calculated from the SJW and expressed as:

$$\frac{5}{6} SJW - \frac{1}{10} SJW = \frac{11 SJW}{15}$$

The method relies on a timing margin large enough to send the embedded sync segment.

When synchronization to the CAN-EF unit has been established after arbitration, the whole frame up to the earliest sample point in the system can be used for embedded data. To maximize efficiency, the earliest sample point (ESP) is decided by the unit with the shortest $t_{seg1} - 0.6 t_{sjw}$ on the bus.

$$t_{esp} = \min_{all\ units} (t_{seg1} - 0.6 t_{sjw})$$

The $t_{sync}$ is adapted to the CAN unit with the longest time quanta to guarantee correct sampling and synchronization. The time left for data bits in the embedded part is $$t_{bit} n_{bits} = t_{esp} - t_{sync}$$

In the case of bandwidth limitation, all parts in a bandwidth limited embedded CAN frame are preferably of equal length. In this case, all embedded samples will have equal timing requirements to the CAN part of the frame.

In the case of clock tolerance limitation, the sync segment at the beginning of every CAN-EF bit improves the embedded frame synchronization interval from 10 to less than 2 CAN bits. The CAN timing will also be improved from SJW to 0.6SJW. The embedded part is therefore guaranteed to have better synchronization than the CAN part and therefore can be set to a higher bit rate. Additionally, improved bandwidth performance can be realized by shortening the embedded bits. The shorter the embedded field, the sooner the resynchronization is done, and full rate embedding is possible.

In the case of maximum arbitration offset, the sync pulse cannot be transmitted without extending it to the phase segment. Sufficient resynchronization must first be reached before the sync pulse method is used. The first part of the data phase toggling CAN bits can be used to achieve the required synchronization.

The embedded frame is characterized by the following parameters:

| Name | Description |
| --- | --- |
| $t_{sync}$ | Number of clock cycles used for the synchronization segment. Max(tbit, tquanta) |
| $t_{bit}$ | Number of clock cycles used for one bit |
| $t_{sp}$ | Number of clock cycles from start of bit to the sample point |
| $t_{can}$ | Number of clock cycles used for the residual CAN frame (at least phase segment 1 and 2) |
| $n_{bits}$ | Number of embedded bits in one CAN bit |
| $t_{esjw}$ | Embedded sync jump width |
| $sjw_{min}$ | Minimum CAN sync jump width used by any unit on the bus. |
| $t_{drift}$ | The number of clock cycles of synchronization drift between units per CAN bit. |
| $tm_{min}$ | Minimum timing margin after arbitration. |

Figure 25:
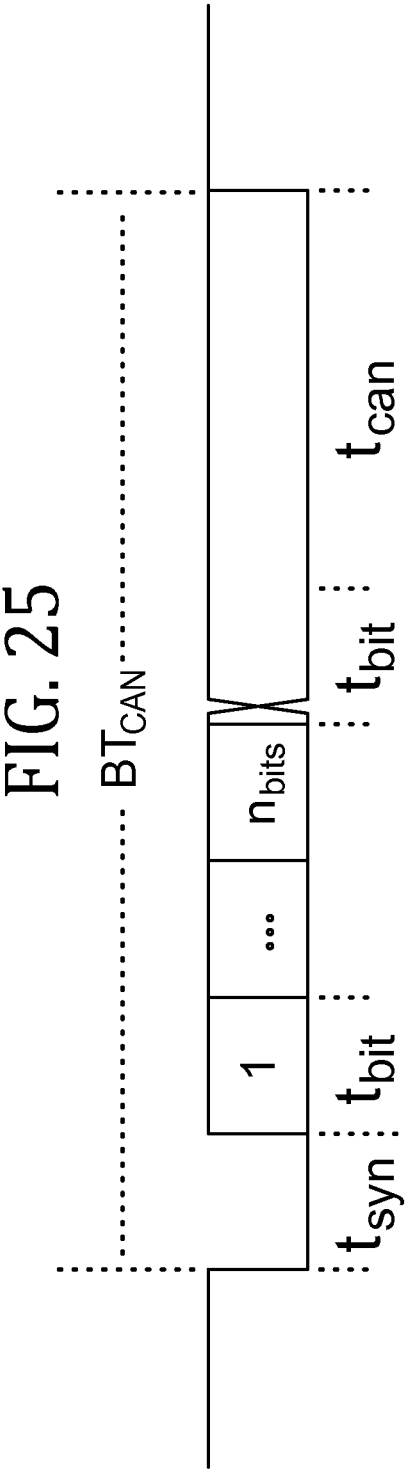
FIG. 25 illustrates a relationship of various CAN-EF parameters in a bit time (BT) as configured in accordance with various embodiments of the invention.

The following relationship between CAN and embedded frame timing (illustrated in FIG. 25) also applies.

$$t_{sync}+t_{bit}n_{bits}+t_{can}=(1+t_{seg1}+t_{seg2})t_{quanta}\ t_{can} \geq t_{bit}$$

Only synchronization edges that are early or late by $t_{esjw}$ will be used for synchronization. The $t_{sync}$ length is adjusted so that at the value received is at least one time quanta even in the worst case scenario dominant-recessive-dominant transition. A short recessive pulse is shortened by the CAN bus characteristics with active dominant drive and pull-up for recessive values. The receiver filtering could also introduce shortening of pulses detected by the receiver.

Figure 26:
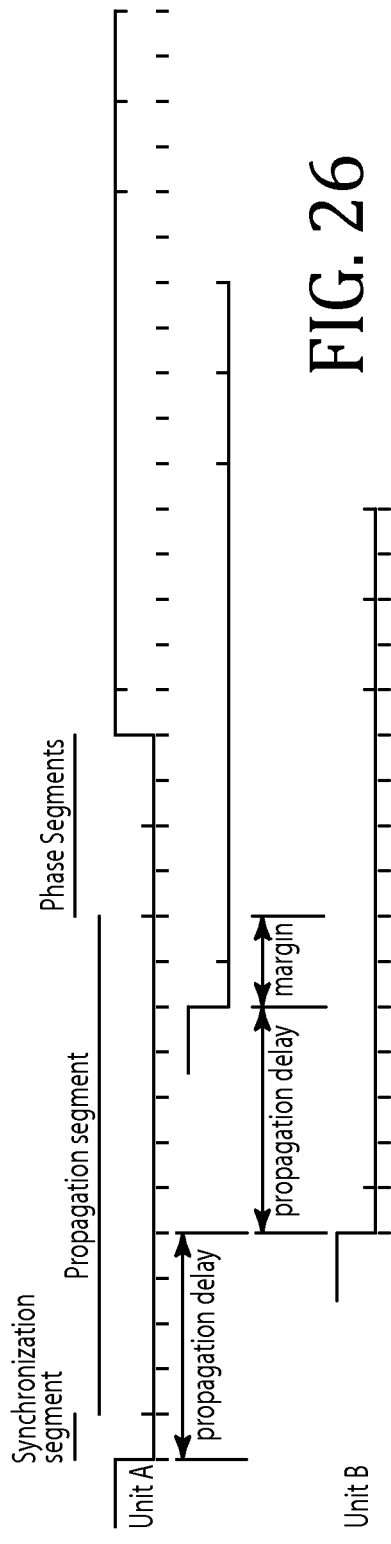
FIG. 26 illustrates a possible state of communication between two modules A and B after an arbitration sequence.

The timing margin is the residual part of the propagation segment when the propagation delay has been taken into account. The scenario in FIG. 26 is a possible state after arbitration. Every change of the data after the part inside the timing margin could be interpreted as a CAN error.

Bit Stuffing

Figure 27:
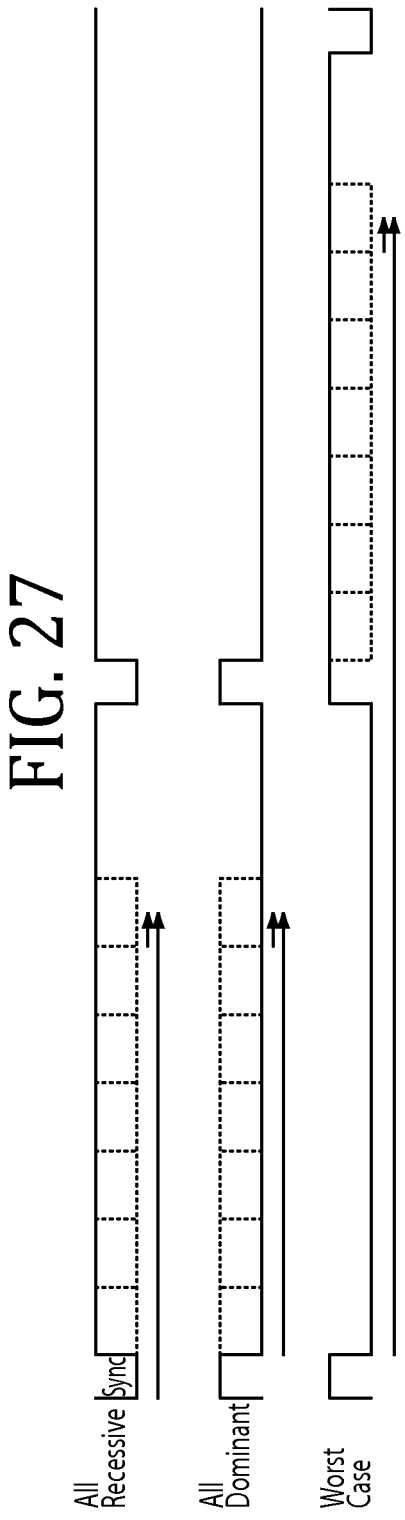
FIG. 27 illustrates inversion of the last CAN bit to force a synchronization edge following a recessive and a dominant bit together with a worst case bit stuffing scenario.

The timing in the embedded field requires a more precise timing than the sampling in the CAN bit. This timing improvement can be achieved without any protocol cost if the sync segment bit is always transmitted as the inverted value of the last CAN sample as illustrated in FIG. 27. This method will give the required edge following a recessive sample. A synchronization edge will be generated at the latest in one CAN bit period following a dominant CAN bit. A stuff bit with wrong polarity will generate a stuff error.

The worst case oscillator tolerance requirement for the embedded frame is given by the following equation:

$$df < \frac{t_{ESJW}}{2((1+TSEG1+TSEG2)BRP+t_{bit}(n_{bits}-1)+t_{sp})}$$

To implement the above approach, a few other parameters are determined. First, the number of CAN bits from the last sync edge is counted. The counter is reset to zero for a synchronization edge detected before the RTR bit, as a sync edge in the RTR bit can only be generated by the transmitter the sync edge is counted as a timing offset correction. The value of the counter is the number of clock drift bits ($n_{cdb}$). The $n_{cdb}$ is proportional to the worst case accumulated clock offset.

Next, the number of dominant synchronization edges ($n_{se}$) from and including the RTR bit is counted. Every synchronization edge increases the timing margin by at least the minimum $t_{sjw}$.

The total time margin, $tm_{tot}$, that can be used to send embedded data is calculated using the following equation:

$$tm_{tot}=tm_{min}+n_{se}*sjw_{min}-n_{cdb}*sjw_{min}/10$$

where $sjw_{min}/10$ can be substituted for the real known maximum clock drift.

While $tm_{tot}$ is less than $t_{sync}$, CAN bits with alternating recessive and dominant values is transmitted to gain the required head room. If $tm_{tot}$ is larger than or equal to $t_{sync}$, $t_{sync}$ is subtracted from $tm_{tot}$ and the sync segment is sent.

While $tm_{tot}$ is larger than or equal to $t_{bit}$, $t_{bit}$ is subtracted from $tm_{tot}$, and an embedded bit is sent. A new $tm_{tot}$ is calculated for every new bit and the decision process is restarted until all embedded bits fits in one bit period.

When synchronization is reached the CAN bit field of the CAN EF bit can be used to carry packet data information. The padding bits will be sent with diagnostic message bits until the number of CAN bits given by the DLC is sent. The data part is always started by an embedded DLC (EDLC) and is ended with an embedded CRC (ECRC).

This method will be precise and will dynamically adapt to the data on the bus. Also, this method takes into consideration the actual requirement of the phase segment that could be less than the SJW depending on the time from last sync.

Embedded Frame Format

Figure 28:
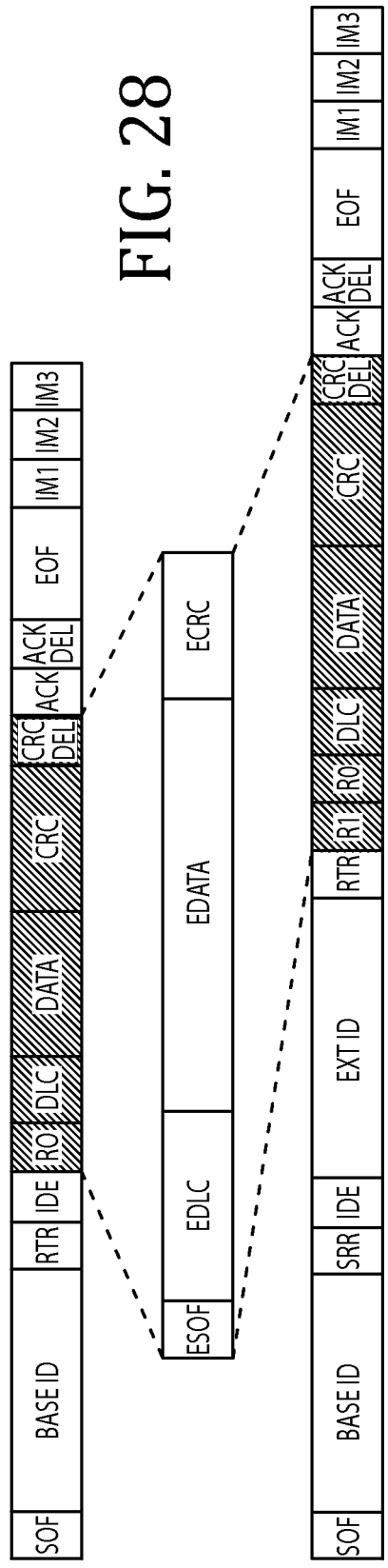
FIG. 28 illustrates an example CAN-EF frame format as embedded within a CAN bit and an extended CAN bit as configured in accordance with various embodiments of the invention.
Figure 29:
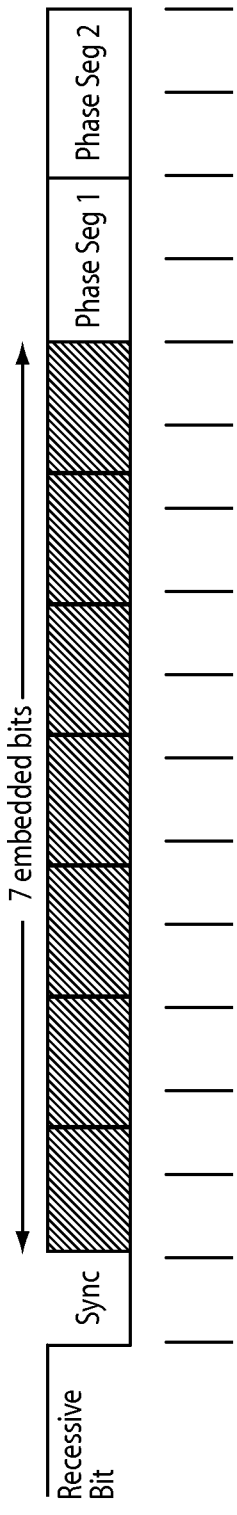
FIG. 29 illustrates where CAN-EF embedded bits can be sent within a CAN transmission.

The previous section has described how to embed the CAN EF data bits in an ordinary CAN bit. In this section the frame format for the embedded data part is described With reference to FIGS. 28 and 29. The embedded CAN frame is sent as a sequence using the available embedded slots and CAN bit slots. In practice, the actual start of the embedded frame depends on EF bus parameters.

The start of an embedded frame (ESOF) is signaled in the same way as a CAN FD frame, by sending a recessive R0 or R1 bit. The start of frame field is used to distinguish an embedded CAN frame from an ordinary CAN frame and from the resynchronization phase of an embedded frame. A CAN EF unit receiving a recessive R0/R1 will do a hard synchronization at the next recessive to dominant edge. If the sync margin is large enough, the sync will be done immediately following the ESOF bit. A recessive ESOF signals that the frame is a CAN EF frame, but the real start of the embedded frame is delayed until sufficient synchronization is achieved. The synchronization requirement is both related to CAN units and to CAN EF units.

The embedded data length code (EDLC) is the first 6 bits following the ESOF. The EDLC allows embedded packets of 0-64 bytes of data. The EDLC counts both embedded bits and data bits sent at the CAN bit timing. The embedded data frame (EDATA) is sent using every available bit during and after synchronization and up to and including the CRC delimiter. When no more packet data is left to be sent, diagnostic bits are sent as padding.

FIG. 30 illustrates 80 CAN EF bits sent using two CAN bytes. The ramp up in the beginning is part of the design to use as many bits as possible during the arbitration offset compensation period.

The embedded CRC (ECRC) is transferred at the end of the frame in the same way as the data bits. The ECRC is started at a time in the frame that both sender and receiver can agree upon, and the ECRC should be completely transferred at latest in the CRC delimiter.

In the embedded phase the CAN transmitter logic will keep synchronized to the frame but will not transmit on the bus, and it will not detect bus errors. The embedded transmitter and receiver are run asynchronous to compensate for the rx/tx-loop delay. The transmitted data is stored in a FIFO for comparison with the received data to detect bus errors.

In this example, all available embedded frame bits are not utilized to the maximum, instead the protocol has been kept close to the CAN protocol for simplicity of implementation. The CAN stuff bits and the extra embedded fields in DLC, DATA, CRC, and CRC delimiter CAN fields can also be used for data transfer. In some configurations quite a large number of extra bits could be used for data. The occurrence of stuff bits is not easily predictable, and the maximum number of bits in this channel will vary depending on the data transmitted. Additionally, the best effort channel could be used for diagnostic messages including, for example, error counter values, error passive flag, bus parameters used, sender ID, sender capabilities, and glitch count. If every message is preceded by a message identifier, the EF unit can add diagnostic messages to the best effort channel on demand or on change.

The current proposal uses the CAN bit for data transfer. If the CAN bit value is used to control the stuffing of the data field, other alternative frame formats can be sent. Examples include sending a minimum number of stuff bits in the CAN channel and sending a maximum number of stuff bits in the CAN channel where the number of stuff bits in the CRC may still be hard to control.

Another optional configuration is to only send acknowledgements for IDs matching a filter. This approach can assure that a valid unit received the packet.

Pure EF Mode for Higher Speed

To be able to achieve better performance, the CAN-EF protocol can be implemented in an environment where the CAN compatibility restrictions can be abandoned. Various properties can be changed in this environment to achieve a more efficient protocol, including for example, one or more of: having a variable ID length, keeping high priority messages short, removing the IDE bit, removing the remote transmission request, having a high speed data field, and shortening the end of frame field. Some of the important properties of CAN are saved, including: arbitration, error frame, and an adapted approach to frame synchronization method.

To achieve a more efficient bit format, the stuff bits are still inserted with arbitration bit intervals, but no gaps in the data are inserted ($t_{can}=0$) to achieve CAN compatibility. The $t_{can}$ is expected to be larger than $t_{bit}$ because a CAN worst case resynchronization interval is 6 CAN bits compared to the less than 2 CAN bits for the embedded protocol. The extra margin can possibly allow more than one embedded bit to replace the CAN bit allocated part of the bit period. The synchronization offset after arbitration is handled with a hard synchronization, and as a consequence, all embedded slots can be used immediately.

A system with relatively good clock tolerances can increase the distances between stuff bits by increasing the number of embedded bits. This method will lower the overhead associated by the stuff bits. As a consequence, the data stream can be misinterpreted as either an error frame or a bus idle, and error frames will not be detected because no stuff bit is overwritten. In this situation an alternative mechanism for error frames and frame synchronization must be used.

One of the larger penalties from the CAN compatibility is the length of the ID field. This may be improved by introducing variable length ID field. The shorter identities are assigned the high priority messages and the most common messages.

A new frame format can be used, which is substantially shorter in some cases. The new frame is illustrated in the table below.

| Arbitration | 1 | 2 * id_sz | 2 | | | | 1 | 1 | 1 |
|---|---|---|---|---|---|---|---|---|---|
| High speed | | | | 8 | 8 * nbytes | 24 | 3 | | |
| | SOF | ID | TERMINAL | DLC | DATA | CRC | CRC DELIM | ACK | ACK DELIM |

The ID field, which has a variable length nbits=2k, where k is between 0 and 15. The TERMINAL field is always two dominant bits. An eight bit DLC allows 0 to 255 bytes of data in a packet. When the size of the ID field is set to 0 and no data is transferred in the data field, the minimum packet size of 6 arbitration bits and 35 high speed bits are sent.

The ID field is encoded using 2-bit symbols. 00 is used as the termination symbol and can only be used as the last symbol of the ID. 01, 10, 11 are used in the arbitration. The shortest code wins. The highest possible priority ID is 00. The following are four example unit ID's:
Unit a: 01 10 10 0*1 11 11 00
Unit b: 01 10 1*1 00
Unit c: *11 11 11 11 11 11 11 11 00
Unit d: 01 10 10 00

The star marks the point a unit loses arbitration and becomes a receiver. Unit d wins arbitration after 8 bits and terminates the sequence. With this approach, 25% of all possible ID values are lost, but the lost ID numbers could be compensated by adding one extra ID bit.

If the data packet restrictions from CAN FD are kept, the new protocol uses 23 arbitration bits less than CAN FD and one HS bit more in this case. The difference shrinks for longer ID fields.

The ratio of stuff bits between the protocols is data dependent. The embedded format uses one stuff bit for each CAN bit. When using 8 embedded bits for each CAN bit, the embedded format has one stuff bit for every eight bits. The CAN FD protocol uses one stuff bit every five bits if the data is all ones or all zeroes.

The Overload frame cannot be used with only one ACK delimiter bit, an intermission bit should be added if this functionality is needed.

At least one bit is reserved for protocol extension. Reserved bits should be designed to be forward compatible. If a newer protocol than supported is detected, the unit shall enter listen mode and wait for backward compatible resynchronization sequence.

The end of frame field has multiple functions. First, the EOF field can detect a unit that misinterpreted the DLC field and is still receiving data or a unit receiving data when EOF is transmitted. The EOF field is long enough to create a stuff error. The EOF field can also allow new units to resynchronize to the bus.

A unit trying to synchronize to the bus communication will have two cases to handle. First, the idle bus is recognized by a period of 11 recessive bits as in CAN. Second, if the bus is active, the CRC DELIM bit must be detected. The CRC DELIM is designed to make resynchronization possible. A unit searching for synchronization will set bit synchronization to the falling edge. The CRC DELIM is kept recessive long enough to generate a stuff bit violation as illustrated in FIG. 31. The combination of the high speed dominant bit and the stuff violation is a unique combination for the CRC DELIM field. In case of an actual stuff error being detected, the bit positions at both ACK and ACK DELIM would be overwritten and the unit would resynchronize to the end of the error frame.

The fixed form stuff violation in the CRC DELIM field is used as an end of data field marker. A unit misinterpreting the DLC and that is still sending data will generate a stuff error at this point. A unit reaching the CRC DELIM when the transmitter is still in the data field will generate a fixed form error.

The error frame is sent as six symbols at a CAN bit rate and works as in CAN with the exception of the error frame delimiter. The error frame delimiter is removed. The error frame should be terminated by a sequence matching the CRC delimiter, ACK slot, and ACK delimiter but without the first dominant edge. This sequence provides a resynchronization edge in the ACK slot resulting in a good synchronization for a start of frame immediately following the ACK delimiter. The RTR field of a regular CAN protocol is replaced by ID mask matching response buffer.

Idle Bit Communication Protocol

During bus idle, every falling edge will be used by the CAN receivers to do hard synchronization. If the dominant bus event causing the edge is shorter than the propagation segment of the bit, it will not be considered a start of frame bit. One dedicated coordinator module can be used to send information in the periods between the dominant edge and the end of the propagation segment. With sufficient bandwidth and length of the propagation segment, multiple bits of information could be sent during this period. The dedicated coordinator can be any module (such as those described herein having a processing device configured to control its activity and communication port configured to allow communication on the network) on the communication network, but preferably it will be located toward a physical middle of the bus to shorten a longest distance to a communication module on the network. With brief reference to FIG. 10, the dedicated coordinator could be the module 705 located toward the middle of the illustrated bus 701.

The dedicated coordinator could be used in one or more of the following ways: to support for auto-baud, to distribute bus parameter settings where any unit connecting to the bus can immediately get the correct bus parameter settings, to distribute time, to send scheduling information (set current minimum priority, mask, and the like), to send a beacon, to take and send diagnostic information, to make bus signal quality measurements, and to delay measurements. If all nodes are assigned a unique identity, the coordinator could target one node at a time. The idle bit communication would be a non-intrusive best effort channel. The coordinator could send requests to a specific node, and that node could then be allowed to send its response. A start of frame condition would delay the frame until the packet has been sent and the bus returns to idle state. Even if the coordinator is a solution that is not acceptable as a general communication concept, the concept could be useful as a part of the test equipment.

In another application, during arbitration is it possible that the first sampling point will move into the propagation segment; to move the sampling point, recessive to dominant edges can be transmitted in the Synch-Segment to secure that those receivers having the sampling point in the propagation segment move the sampling point out of the propagation segment as given by the CAN protocol rules. If the dedicated coordinator is placed in the middle of the physical medium, sending dominant Synch-Segment during the idle phase will force the units using the CAN protocol to be synchronized to this pattern. By having this synchronization, all units start sending within 25% of the propagation segment. This behavior can be used in two different ways. It can be used to secure that the first protocol sampling point will never move more than 50% into the propagation segment thereby allowing the start of sending embedded bits in at least 50% of the propagation segment without having to wait for a number of edges to move the first sampling point out from the segment. The other use will be to increase the cable length in a communication system using the first protocol. By having the idle phase synchronization sent from a unit in the middle of the physical medium, it will be possible to have double delay between the outmost units in the CAN-system compared to the rules that normally apply to a system according to the first protocol (CAN). It this system it will still be possible to use embedded bits as described; however, with the extended cable length, it is possible after an arbitration that the first protocol sampling point can be in any part of the propagation segment thereby requiring a number of recessive to dominant edges in the Synch-Segment to secure that the embedded second protocol bits will not hit the first protocol sampling point.

The idle bit communication method can be used to determine the worst case bus parameters used on the bus. The scan is started by a dominant sync pulse that is lengthened until an error frame is detected. The error frame is generated when the dominant sync pulse is sampled at one of the receivers' sample point. The length of the sync pulse is a measurement of the maximum usable propagation segment on the bus.

Figure 32:
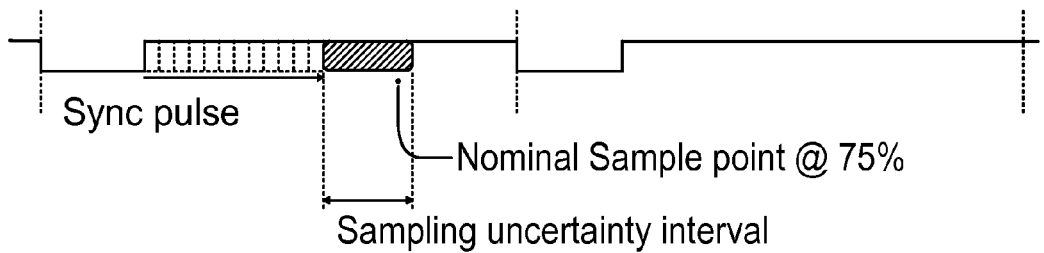
FIG. 32 illustrates two bit periods with initial synch pulses.

FIG. 32 illustrates two bit periods with initial sync pulses. The actual sampling will be within an uncertainty period around the nominal sample point. The actual setting will be determined when the sync pulse is long enough to reach into the sampling interval. At that moment a false start of frame will be detected and an error frame is generated.

The idle bit communication principle does not only work during idle bus, but in every recessive bit under certain circumstances. The simplest use of this would be a synchronization pulse overlay. The sync pulse overlay can be used to synchronize all units on the bus to one coordinating sync pulse transmitter. The sync pulse is sent in every bit time interval as a dominant pulse at the beginning of every bit. The sync pulse must be short enough to not be detected as a dominant bit by any receiver on the bus segment. The sync pulse interval must be shorter or equal to the shortest bit time of any receiver on the bus to force all units to remain synchronized to the coordinator. The sync pulse is sent in the bus idle period as well to guarantee that all units are hard synchronized to the synchronizing unit. If all of the above requirements are met, all units on the bus will remain synchronized to the coordinator.

The benefit of this method would be that the maximum number of bit periods between synchronization edges would be 6 bit periods compared to the 10 bit periods of a standard CAN bus. The sync pulse can also be used to gather some information about the location of the nodes on the bus. As all units are kept synchronized to the coordinator the distance between the coordinator and the node can be estimated when the unit transmits a dominant bit following a recessive bit.

Figure 33:
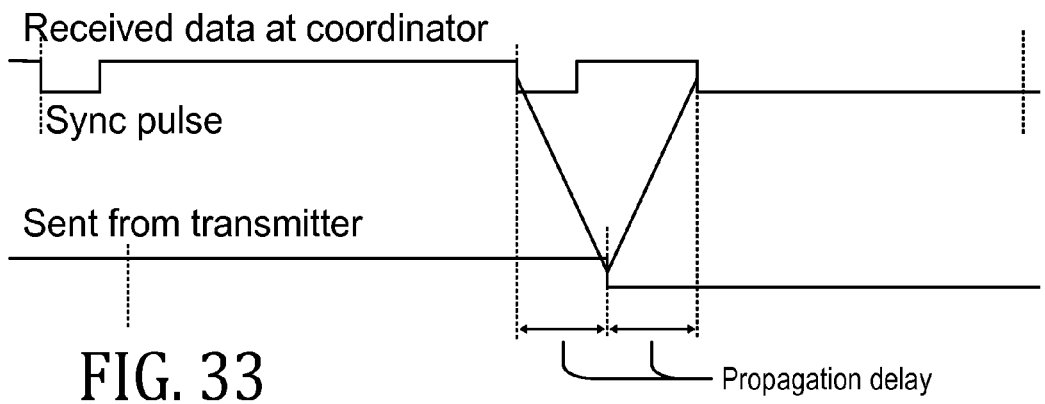
FIG. 33 illustrates a propagation delay between a transmitting device and receiving device.

FIG. 33's upper timeline shows the bus at the receiver of the coordinator. The coordinator receives its own sync pulse as it is transmitted on the bus. The lower timeline shows the data sent from the transmitter. In this case, the transmitter is shown with perfect synchronization to the sync pulse, and it will therefore send the dominant bit at the exact time the sync pulse arrives. The dominant bit will be detected at the coordinator exactly two propagation delays after the start of the sync pulse.

Figure 34:
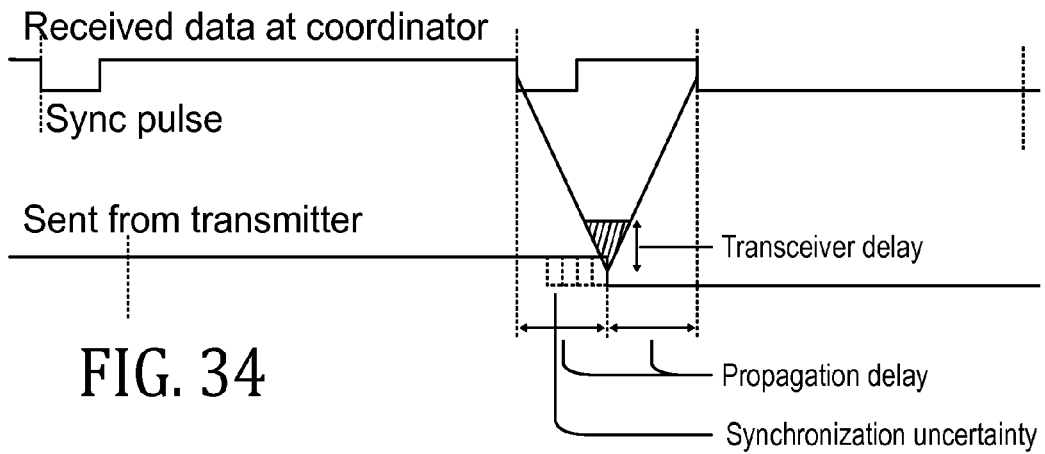
FIG. 34 illustrates synchronization uncertainty within the propagation delay illustrated in FIG. 33.

FIG. 34 illustrates the synchronization uncertainty wherein the synchronization at the transmitter will drift within its synchronization segment, and the propagation delay includes the transceiver delays of the transmitter. The synchronization error can be removed with statistical methods if enough samples are available that can be related to the identity of the transmitter. The transceiver delay will add an uncertainty that is not removed.

The coordinator can broadcast best effort messages during bus idle periods. Every bit in the message is started with a sync pulse, and the rest of the available propagation segment can be used to send information. The broadcasted messages will not interfere with CAN bus communication, but the broadcasted message itself will be destroyed at every CAN protocol dominant bit. The broadcasting data overlay will have the same base properties as the sync pulse overlay with an extra data segment appended. The length of the sync pulse must be long enough to safely be detected by every CAN controller on the bus segment.

Figure 35:
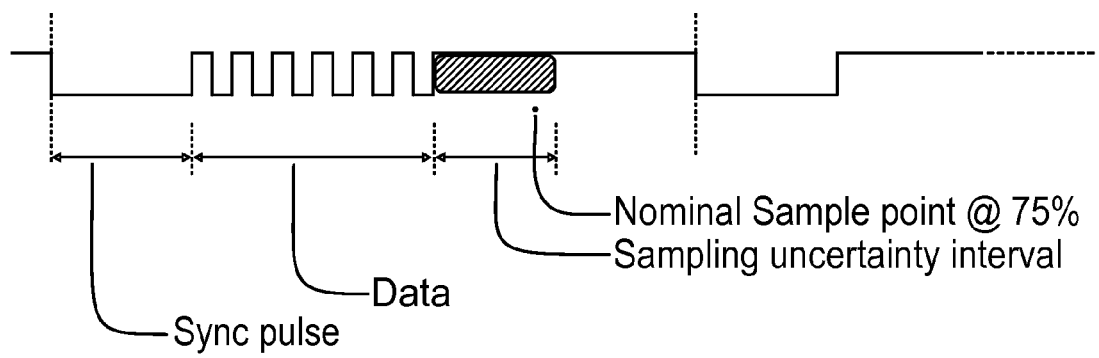
FIG. 35 illustrates a broadcast data overlay as configured in accordance with various embodiments of the invention.
Figure 36:
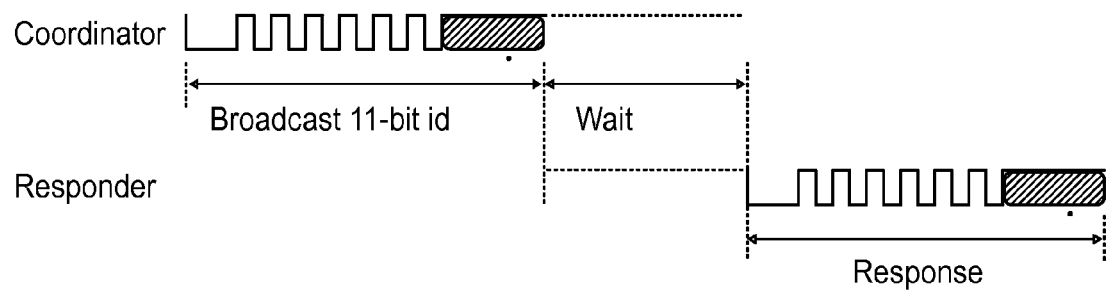
FIG. 36 illustrates operation of a broadcast data overlay in a bidirectional protocol as configured in accordance with various embodiments of the invention.

The broadcasting data overlay can be used to support a bidirectional protocol if a unique addressing scheme can be used. The address is sent in one or more broadcast bits, and the response from a single addressed unit follows after a configurable delay. The unique address could possibly be the CAN identifiers used in the system and only the device configured for a specific identifier would respond. An example use would be to get diagnostic information from a unit with a specific identifier which has been detected to behave erratic. FIG. 35 shows the coordinator sending an idle message with the 11-bit unique identifier and the unit sending the identifier responding after a sufficient delay. The broadcast and response protocol can be built from a sequence of idle bits.

So configured, using the idle bit communication a complete best-effort protocol can be implemented on top of the CAN protocol. The protocol will not interfere with the ongoing CAN protocol transaction and it will possibly improve the bus timing by supplying synchronization edges.

In addition to being used as an idle bus, high speed communication option, the embedded format can be used for diagnostics. For instance, the pattern as described above can also be used to check the maximum performance of a communication medium in a physical media 1511 as seen in FIG. 15. There are millions of CAN-busses already installed in cars, trucks and machines that work perfectly well with the nominal bit-rate. The most common bit-rate is between 125 to 500 kbit/s. A few are higher up to 1 Mbit/s, and some are as low as 20 kbBit/s. In many of those systems it is possible to utilize a higher bit-rate, but it is uncertain how much it is possible to increase the bit-rate without problems. In CAN-FD, the bit-rate switch is done in the sampling point, which makes the switch little more complex because there is no edge in close range from the location where you make the bit-rate switch. To locate the bit-rate switch at the same in the bit in the CAN-FD approach, the bit-rate switch done over almost two bits. First, a recessive bit according to the first protocol is followed by a dominant bit. By the sequence of a recessive and then a dominant bit, an edge results in the Synch-Segment. This edge has two functions. First, the edge measures the internal delay from when the edge is sent to the part indicated by 1515 in FIG. 15 until it is received back to the logic as an output from 1513 in FIG. 15. When this delay is known it will be possible to check that every bit is received with the same value as sent out on the communication medium. This is necessary to detect and handle errors according to the protocol. The second use of this edge is to locate the sample point where the device switches from the nominal bit-rate to the higher bit-rate. This switch cannot be done in this bit because this bit is nominal bit that is reserved to indicate future defined protocols. The bit that follows this reserved bit is called the BRS-bit (Bit Rate Switch bit), and when you reach the sampling point in the nominal bit is there a switch to the higher bit-rate. This solution gives a small problem to make a precision measurement in a flexible way. First, it will pass almost to nominal bits from the edge until the sampling point is reached. During this time, the time diverges because different units have clocks with different pace. The units on the bus should also have similar time-quanta because the time you get when add the time-quanta from the edge to the sampling point must be the same to secure that you make the switch at the same instance in time in all modules. Without a very good clock it will be difficult to have a ratio over 20 times between nominal bit-rate and the high bit-rate. In the diagnostic case we would like to get as high precision as possible.

By switching to the high-bit at the edge in the Synch-Segment, it will be possible to make the switch with a precision only limited by jitter in the edge and how fast the logic can sample the level received from the bus-line. The solution will also be dependent on the location of the sampling point. With this freedom it will be possible to set the higher bit-rate independently of the nominal bit-rate. For the test it will be possible to make the EF protocol bits shorter and shorter by one clock cycle in each step. In the low cost FPGA logic available today, it is possible to have a 100 MHz clock, and each step can then be as little as 10 nanoseconds. With more expensive devices it will be possible to have clocks close to 1 GHz, and the resolution will be as high as 1 nano-second. At the same time it is possible by phase shift logic to sample eight times faster than the basic clock which is already used today. The basic pattern is the same shown in FIG. 2 where a nominal bit-rate is used for all bits except bits in the part labeled 108.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:
1. A method of communication among two or more modules over a common control network, the method comprising:
    sending from a communication device over a control network a first message packet using a first protocol, the first message packet defined by bits having a plurality of bit quanta, wherein data for the first message packet is defined by a signal level at defined bit quanta of a bit, the defined bit quanta being less than every bit quanta of a bit;

sending a second message embedded within the first message packet using bit quanta of bits of the first message packet other than the defined bit quanta, the second message using a second protocol;

during an idle status of the control network, transmitting from a dedicated communication module connected to communicate on the control network a synchronization pulse overlay configured to synchronize other modules on the control network to the dedicated communication module;

wherein the first protocol is defined in part by:
checking at a sample point within a received first protocol bit to determine a value of the received first protocol bit, and
adjusting a position of the sample point within the received first protocol bit in response to sensing a transition edge within a defined portion of the received first protocol bit.

2. The method of claim 1 wherein the transmitting the synchronization pulse overlay comprises transmitting a synchronization pulse on the control network in bit time intervals as a dominant pulse at a beginning of individual bits.

3. The method of claim 2 wherein the transmitting a synchronization pulse on the control network comprises transmitting the synchronization pulse being short enough to not be detected as a dominant bit by a receiver on the control network.

4. The method of claim 2 wherein the transmitting a synchronization pulse on the control network comprises transmitting the synchronization pulse at an interval shorter than or equal to a shortest bit time for receivers on the control network.

5. The method of claim 1 further comprising during the idle status of the control network, transmitting from the dedicated communication module transmission properties for the control network.

6. The method of claim 1 further comprising during the idle status of the control network, transmitting from the dedicated communication module a query addressed to a particular communication module on the control network and receiving at the dedicated communication module information from the particular communication module transmitted in response to the query.

7. The method of claim 1 further comprising the dedicated communication module performing on the control network one or more of: supporting auto-baud, distributing bus parameter settings, distributing time information, sending scheduling information, sending a beacon, taking and sending diagnostic information, making bus signal quality measurements, and delaying measurements.

8. A communication device apparatus for communicating with other devices over a control network, the communication device apparatus comprising:

a processing device operatively connected to a communication port configured to connect to a control network to control receiving and sending communications over the control network, the processing device configured to communicate, during transmission of a message packet over the control network according to a first protocol, a second message embedded within the message packet using a second protocol;

wherein the first protocol is defined in part by:
a receiving device checking at a sample point within a received first protocol bit to determine a value of the received first protocol bit, and
the receiving device adjusting a position of the sample point within the received first protocol bit in response to sensing a transition edge within a defined portion of the received first protocol bit;

wherein the processing device is further configured to during an idle status of the control network, effect transmission from a dedicated communication module of a synchronization pulse overlay configured to synchronize other modules on the control network to the dedicated communication module.

9. The communication device apparatus of claim 8 wherein the processing device is configured to transmit the synchronization pulse overlay by transmitting a synchronization pulse on the control network in bit time intervals as a dominant pulse at a beginning of individual bits.

10. The communication device apparatus of claim 9 wherein the transmitting a synchronization pulse on the control network comprises transmitting the synchronization pulse being short enough to not be detected as a dominant bit by a receiver on the control network.

11. The communication device apparatus of claim 9 wherein the transmitting a synchronization pulse on the control network comprises transmitting the synchronization pulse at an interval shorter than or equal to a shortest bit time for receivers on the control network.

12. The communication device apparatus of claim 8 wherein the processing device is configured to, during the idle status of the control network, transmit properties for the control network.

13. The communication device apparatus of claim 8 wherein the processing device is configured to, during the idle status of the control network, transmit a query addressed to a particular communication module on the control network and receive from the particular communication module transmitted in response to the query.

14. The communication device apparatus of claim 8 further comprising wherein the processing device is configured to perform on the control network one or more of: supporting auto-baud, distributing bus parameter settings, distributing time information, sending scheduling information, sending a beacon, taking and sending diagnostic information, making bus signal quality measurements, and delaying measurements.

* * * * *